(12) United States Patent
Yajima et al.

(10) Patent No.: US 8,335,313 B2
(45) Date of Patent: Dec. 18, 2012

(54) ENCRYPTION DEVICE, ENCRYPTION METHOD AND STORAGE MEDIUM STORING ITS PROGRAM

(75) Inventors: Jun Yajima, Kawasaki (JP); Dai Yamamoto, Kawasaki (JP); Kouichi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 12/834,252

(22) Filed: Jul. 12, 2010

(65) Prior Publication Data

US 2010/0278340 A1    Nov. 4, 2010

Related U.S. Application Data

(63) Continuation of application No. PCT/JP2008/000052, filed on Jan. 18, 2008.

(51) Int. Cl.
*H04L 9/06*    (2006.01)
(52) U.S. Cl. .............................. 380/29; 380/37
(58) Field of Classification Search .................. None
See application file for complete search history.

(56) References Cited

U.S. PATENT DOCUMENTS

| | | | | |
|---|---|---|---|---|
| 6,466,669 | B1 * | 10/2002 | Matsui et al. | 380/37 |
| 2002/0186841 | A1 * | 12/2002 | Averbuj et al. | 380/44 |
| 2004/0062391 | A1 * | 4/2004 | Tsunoo | 380/42 |
| 2004/0131180 | A1 * | 7/2004 | Mazuz et al. | 380/37 |
| 2004/0156499 | A1 | 8/2004 | Heo et al. | |
| 2006/0013388 | A1 * | 1/2006 | Suen et al. | 380/28 |

FOREIGN PATENT DOCUMENTS

| | | |
|---|---|---|
| EP | 0 923 062 A1 | 6/1999 |
| GB | 2 398 213 A | 8/2004 |
| JP | 10-333569 A | 12/1998 |
| JP | 3088337 B2 | 7/2000 |
| JP | 2003-241657 A | 8/2003 |
| JP | 2004-240427 A | 8/2004 |
| WO | 98/54687 | 12/1998 |

OTHER PUBLICATIONS

Encryption Technical Specification MISTY 1, Sep. 27, 2001.
Mitsuru Matsui, "Block Encryption Algorithm MISTY", Technical Report of IEICE, ISEC 96-11, Jul. 1996.

* cited by examiner

*Primary Examiner* — Gilberto Barron, Jr.
*Assistant Examiner* — Shaun Gregory
(74) *Attorney, Agent, or Firm* — Staas & Halsey LLP

(57) ABSTRACT

When processing a data conversion function of a MISTY structure, such as the FO function of MISTY1, the logical calculation result t3 of the exclusive OR 614 of the process result of the FI function 602 of the MISTY structure in the second stage and a logical calculation result t1 of an exclusive OR 612 of the MISTY structure in the first stage is not stored in a register. The logical calculation result t3 and the logical calculation result of respective exclusive OR 642 and 643 are subject to a direct exclusive OR with the respective exclusive OR 642 and 643.

13 Claims, 28 Drawing Sheets

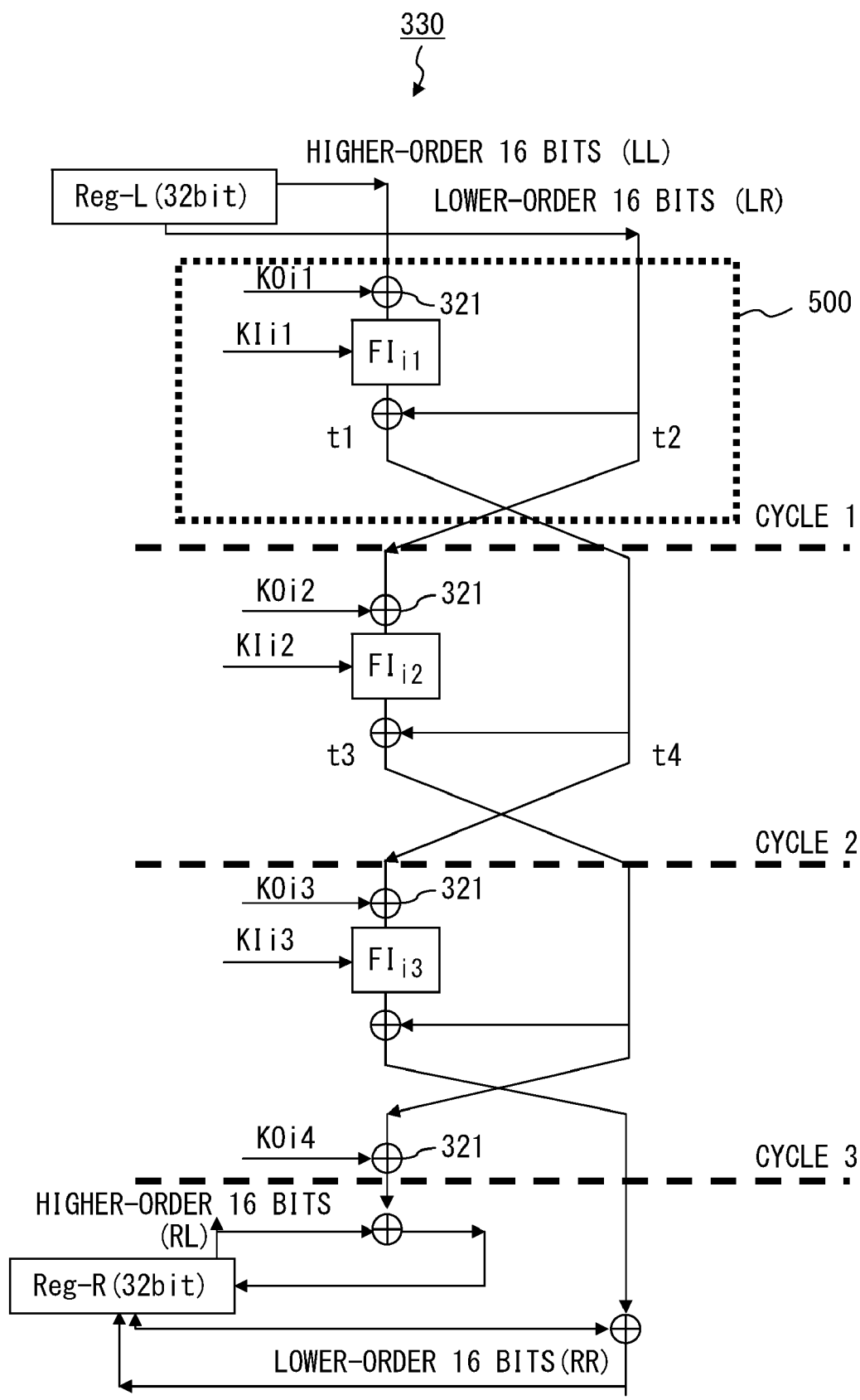
F I G. 3

CONVENTIONAL METHOD
··CYCLE 1··
MOV a, LL
XOR a, KOi1
Call FI(a, KIi1)
XOR a, LR ··CYCLE 2··
MOV b, LR
XOR b, KOi2
Call FI(b, KIi2)
XOR b, a ··CYCLE 3··
XOR a, KOi3
Call FI(a, KIi3)
XOR a, b XOR b, KOi4
XOR RL, b
XOR RR, a

F I G. 6

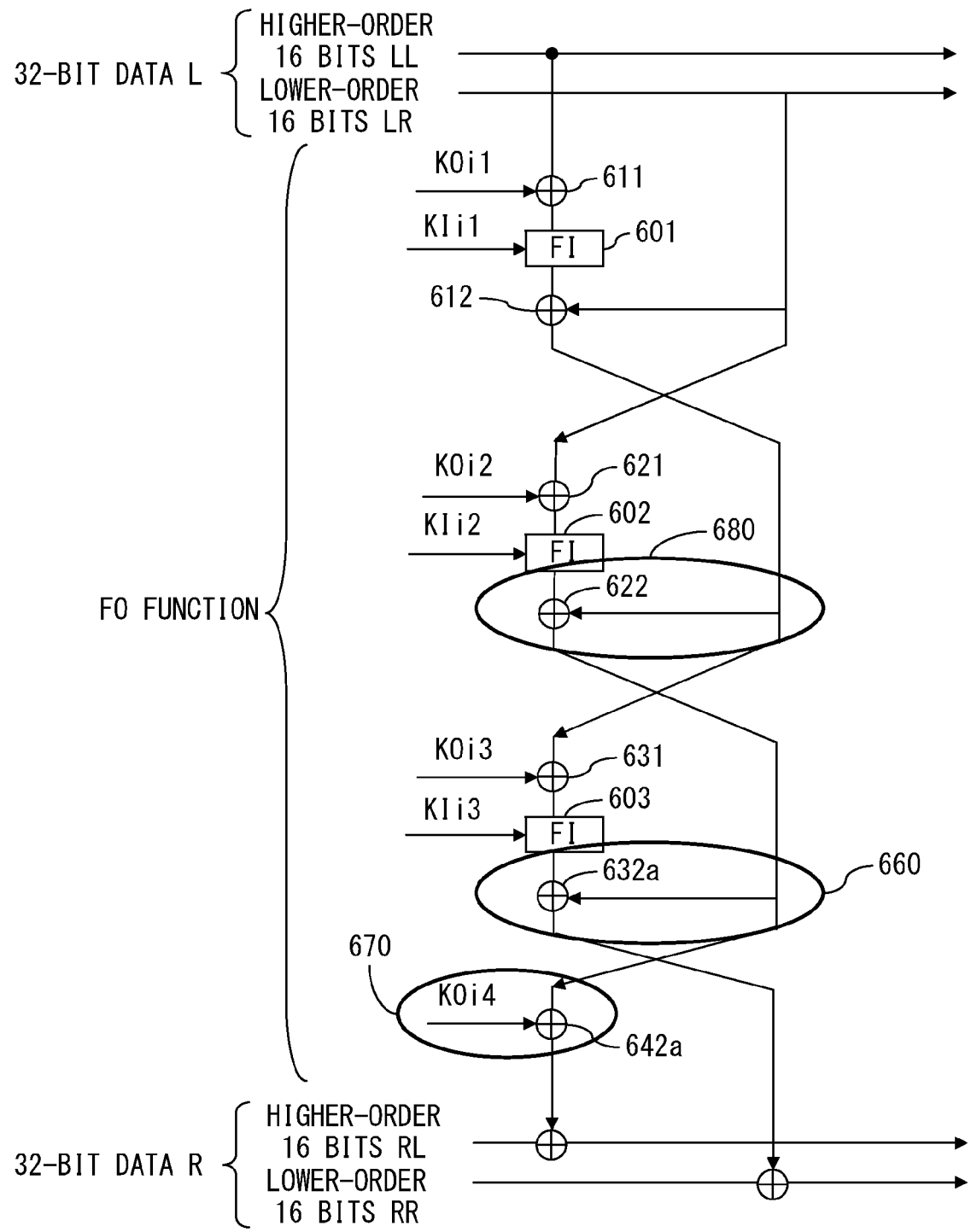
F I G. 9 A

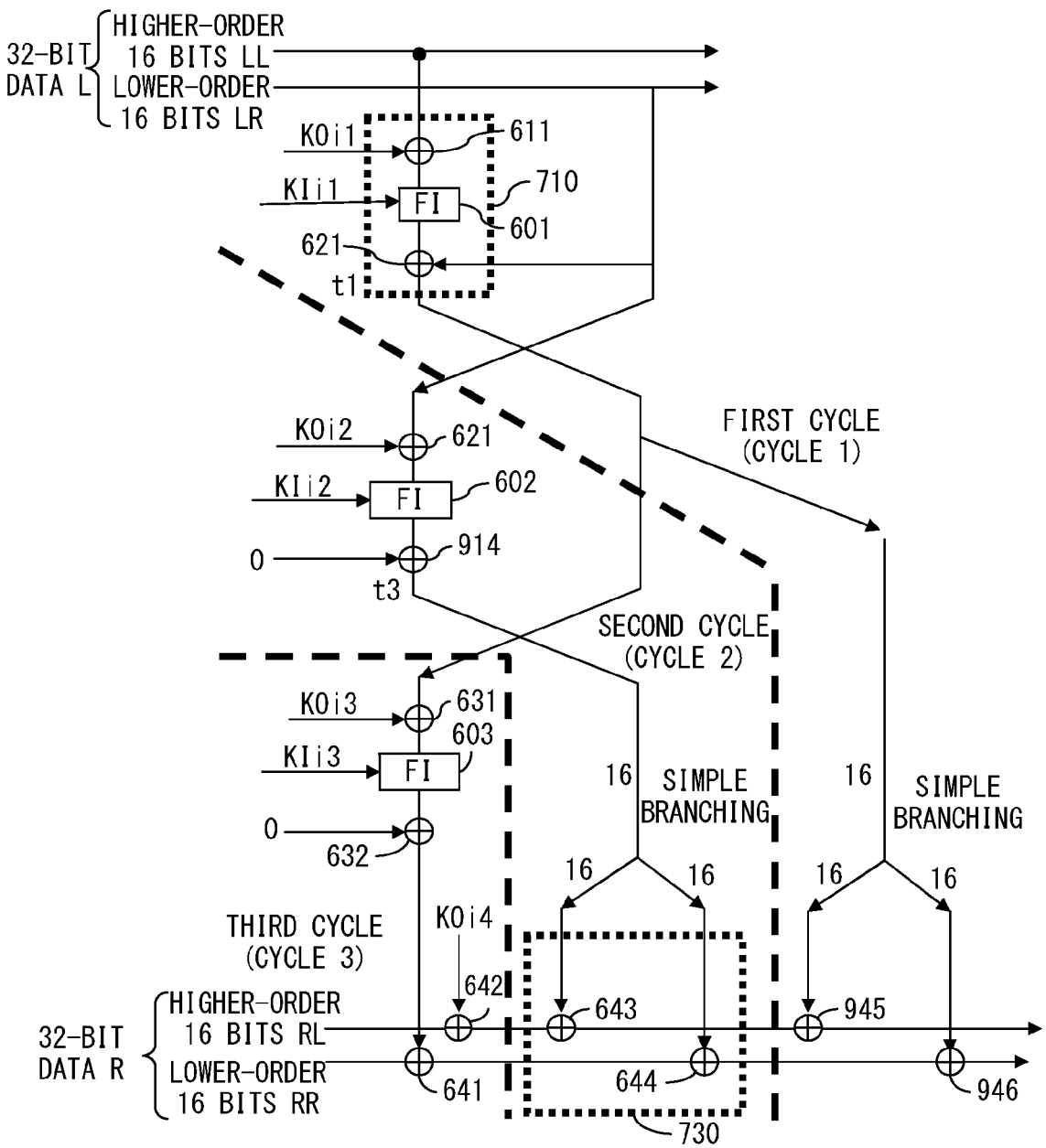
F I G. 10A

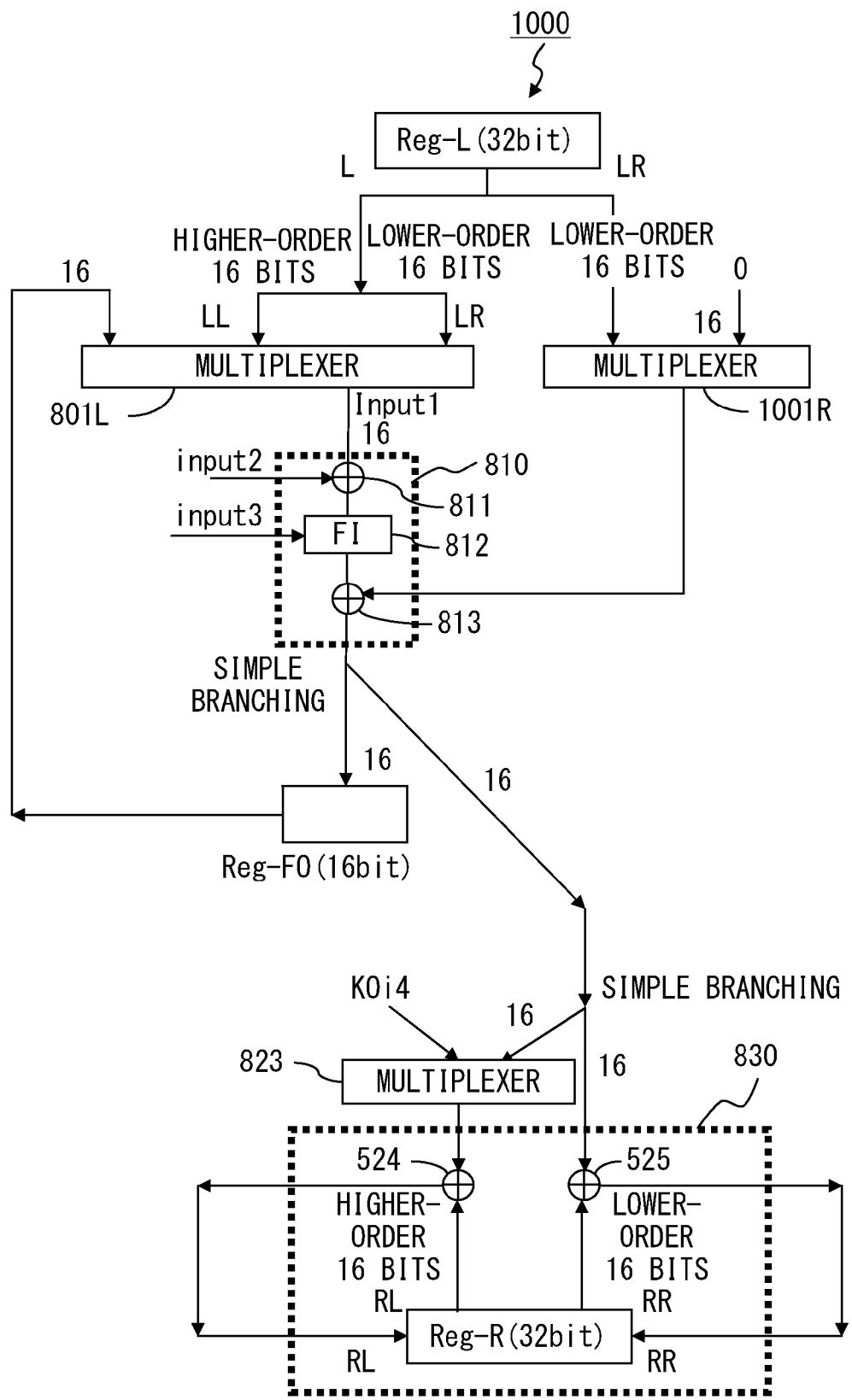
F I G. 1 0 B

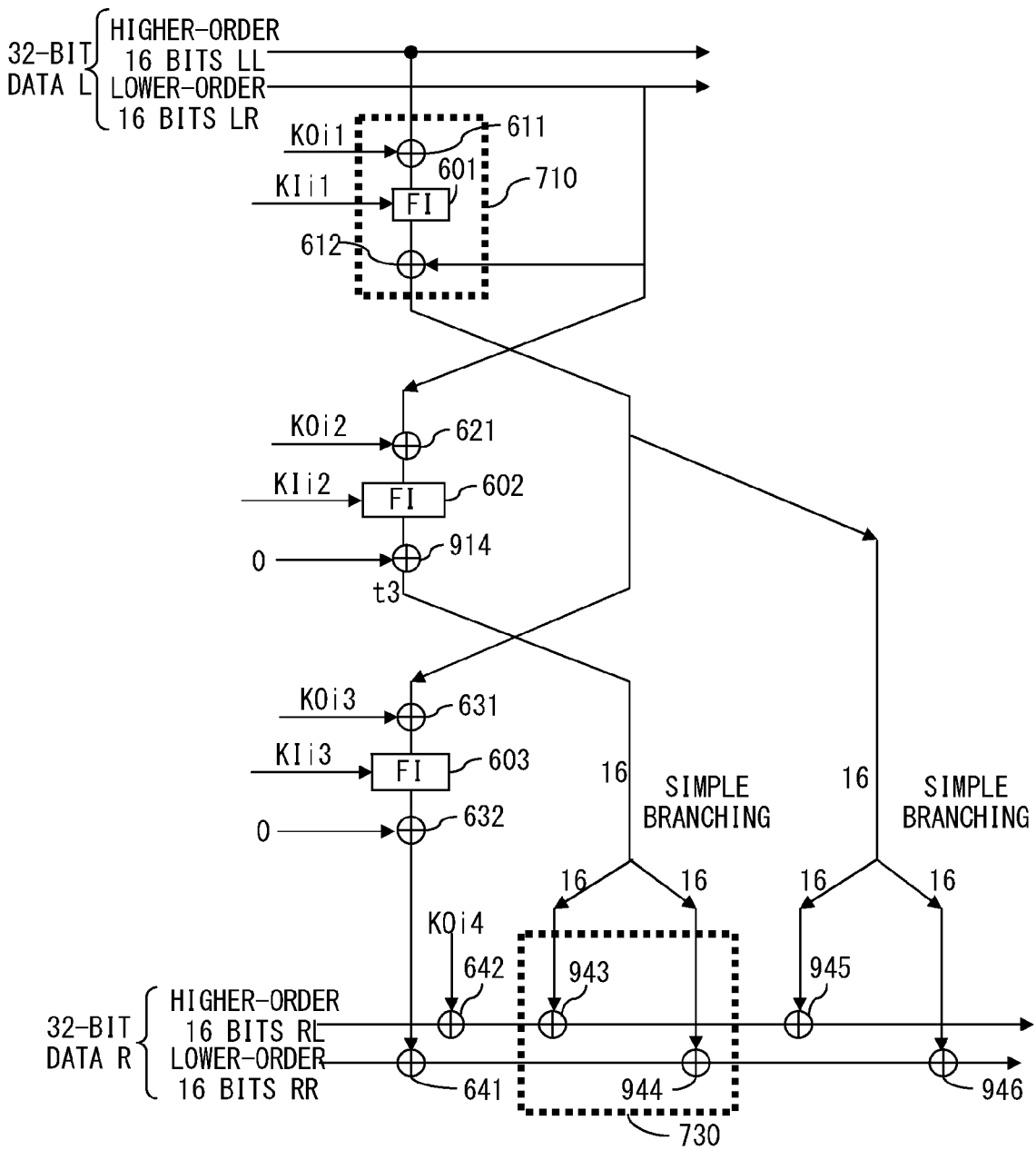
F I G. 1 1 A

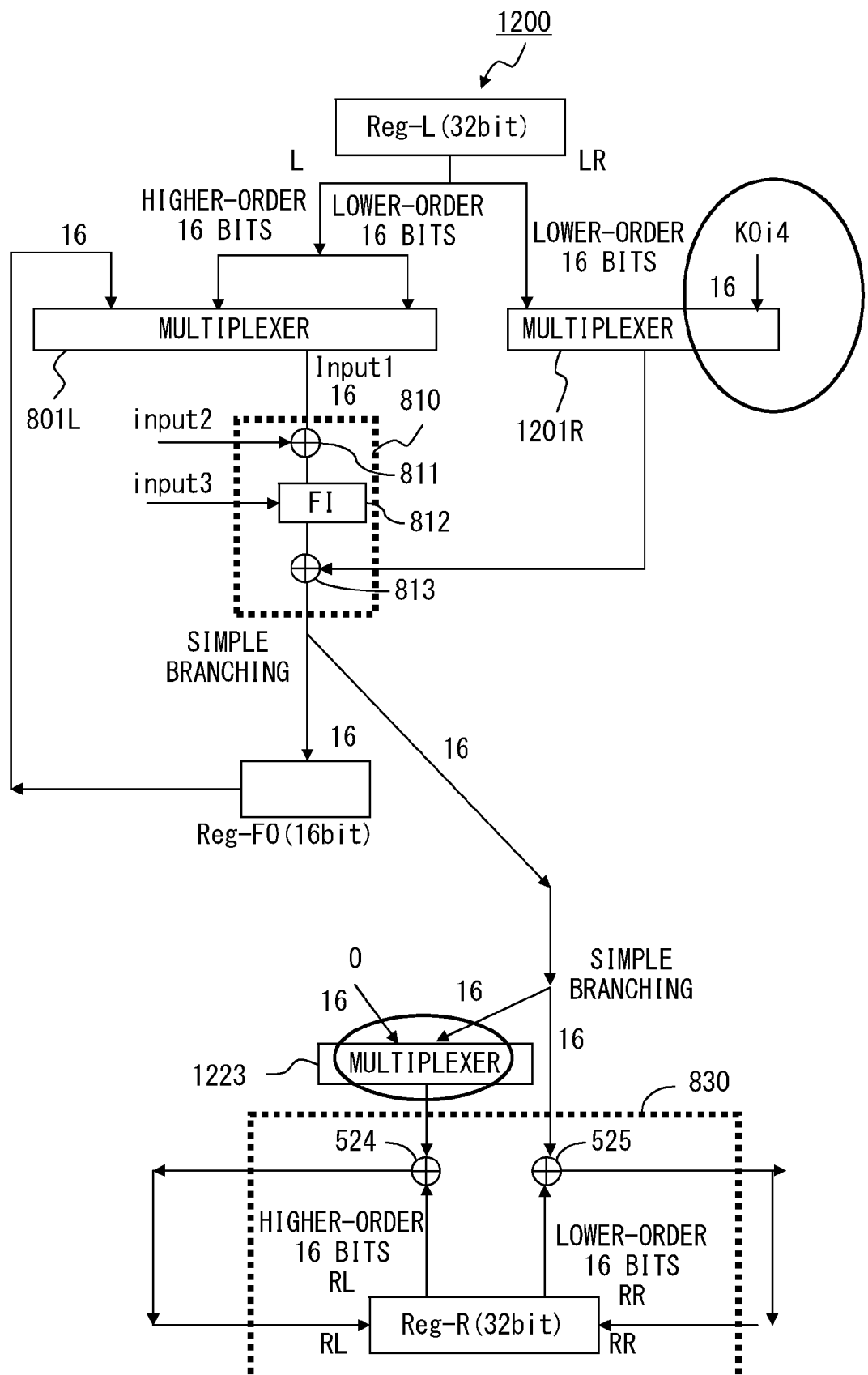
F I G. 1 2

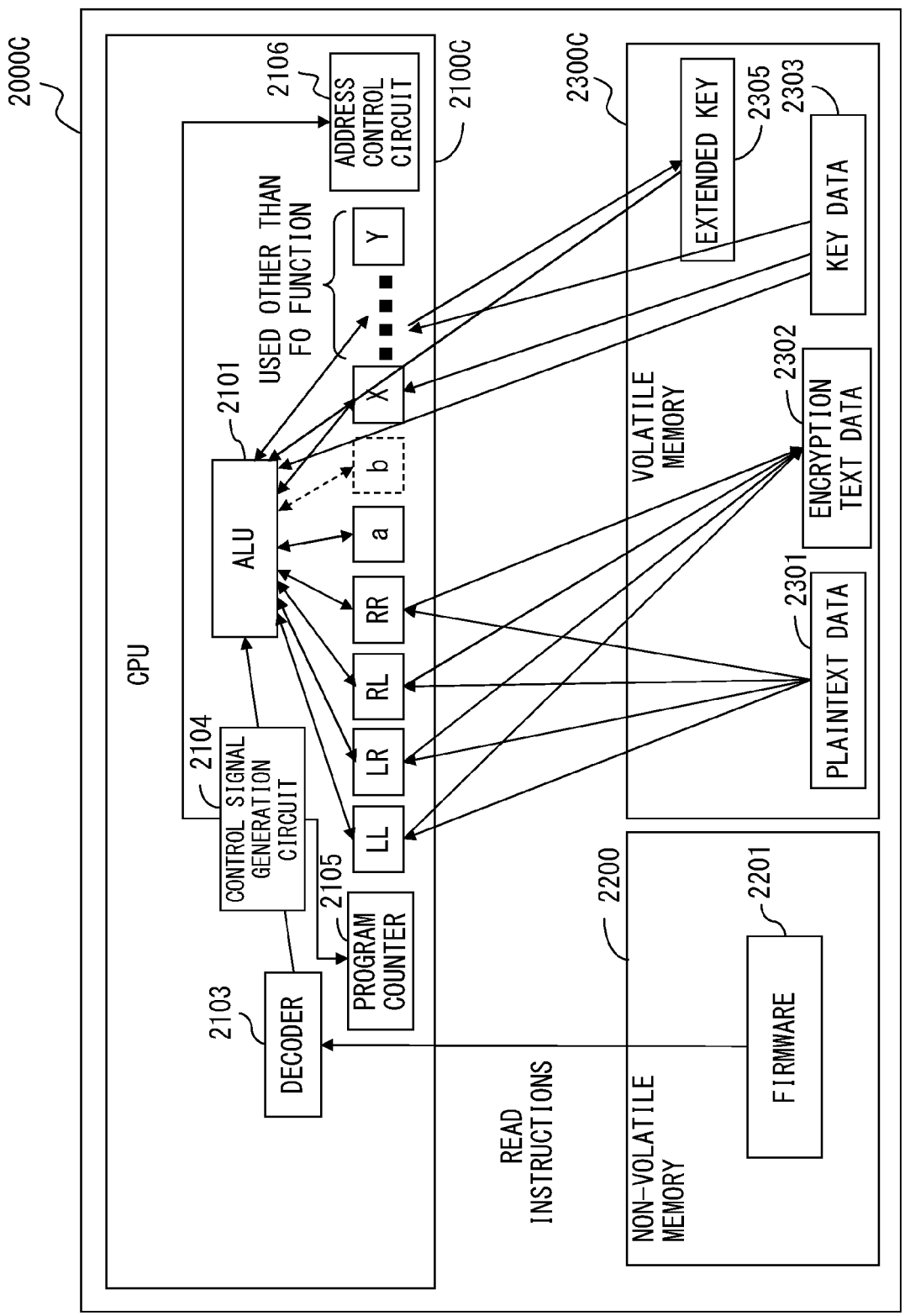
F I G. 15

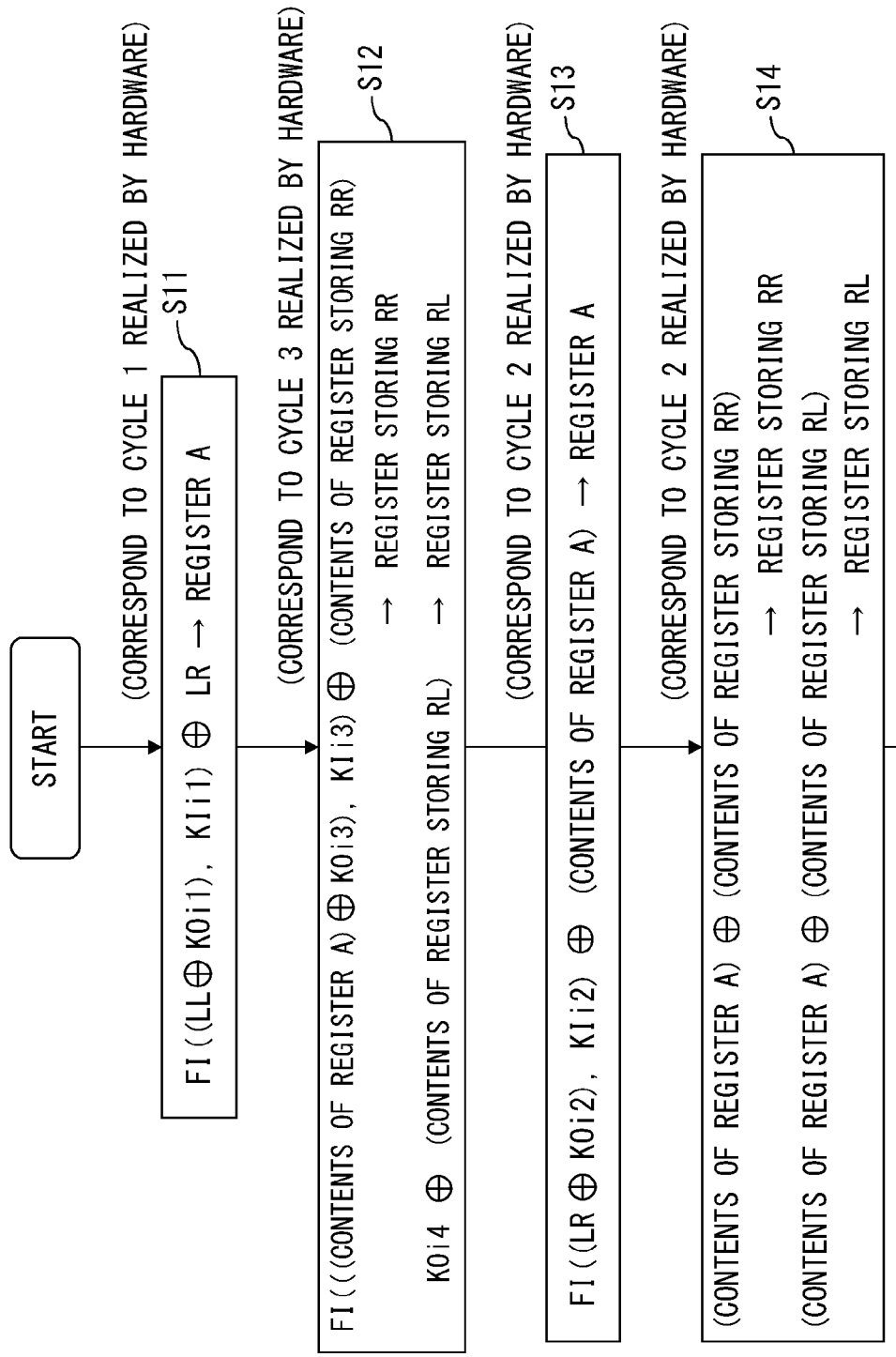
F I G. 1 6

3000A

METHOD 1
　・・CYCLE 1・・
　MOV a, LL
　XOR a, KOi1
　Call FI(a, KIi1)
　XOR a, LR

・・CYCLE 3・・
　XOR a, KOi3
　Call FI(a, KIi3)
　XOR RL, KOi4
　XOR RR, a

・・CYCLE 2・・
　MOV b, LR
　XOR b, KOi2
　Call FI(a, KIi2)
　XOR RL, a
　XOR RR, a

F I G.  1 7

3000B

METHOD 2
　　· · CYCLE 1 · ·
　　MOV a, LL
　　XOR a, K0i1
　　Call FI(a, KIi1)
　　XOR a, LR
　　XOR RL, a
　　XOR RR, a · · CYCLE 3 · ·
　　XOR a, K0i3
　　Call FI(a, KIi3)
　　XOR RL, K0i4
　　XOR RR, a · · CYCLE 2 · ·
　　MOV b, LR
　　XOR b, K0i2
　　Call FI(a, KIi2)
　　XOR RL, a
　　XOR RR, a

F I G. 1 9

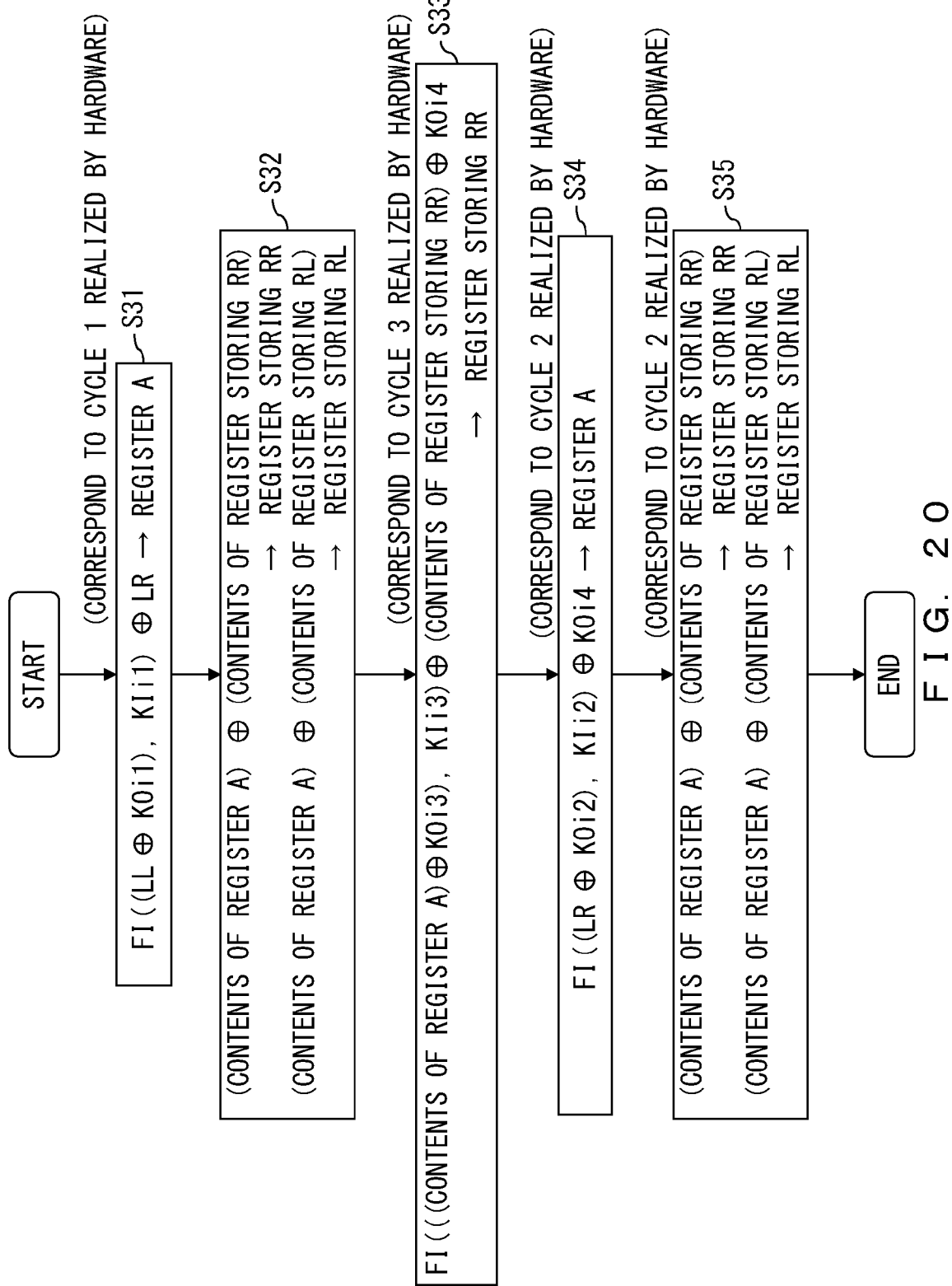
F I G. 2 0

3000C

METHOD 3
 ‥CYCLE 1‥
 MOV a, LL
 XOR a, K0i1
 Call FI(a, KIi1)
 XOR a, LR
 XOR RL, a
 XOR RR, a ‥CYCLE 2‥
 MOV b, LL
 XOR b, K0i2
 Call FI(b, KIi2)
 XOR b, a
 XOR RL, b
 XOR RR, b ‥CYCLE 3‥
 XOR a, K0i3
 Call FI(a, KIi3)
 XOR RL, K0i4
 XOR RR, a

FIG. 21

ENCRYPTION DEVICE, ENCRYPTION METHOD AND STORAGE MEDIUM STORING ITS PROGRAM

CROSS-REFERENCE TO RELATED APPLICATIONS

This application is a continuation application of International PCT Application No. PCT/JP2008/000052 which was filed on Jan. 18, 2008.

FIELD

The embodiments discussed herein are related to an encryption device to which a common encryption key method id applied, its encryption method and its program, and more particularly to an encryption device using a data conversion function of a MISTY structure, its encryption method and its program.

BACKGROUND

An encryption method is roughly divided into a public key method and a common key method. The public key method uses different keys for encoding and decoding and ensures the security of transmitting information by letting only a receiver know a key for decoding an encoded text (private key) instead of publicly opening a key for encoding (public key). However, the common key method uses the same key for encoding and decoding and ensures the security of transmitting information by preventing the private key from being known by a third party other than a transmitter and a receiver.

When the encryption of a common key (hereinafter called a "common key encryption") is compared with the encryption of a public key (hereinafter called an "public key encryption"), the common key encryption has an advantage that its process speed is fast and it can be compactly installed. Therefore, when an encryption function is added to a small-size device, such as a cellular phone, an IC card and the like, a common key encryption is used. Since its process speed is high and it can encode/decode information in real time, it can be also used for information communications in the fields of broadcast and communications.

The common key encryption is divided into stream cipher and block cipher. The block cipher divides a plaintext (text to be encoded) into groups with a certain bit length (called a "block") and encodes it in units of groups. The bit length of a block being the process unit of encryption is called a "block length".

As to the common key block cipher, various algorithms are known according to its block length. DES, AES, SC2000, MISTY 1, MISTY 2, KASUMI and the like are its typical ones. These common key encryption algorithms are installed by software or hardware.

Next, MISTY 1 being one piece of common key encryption will be explained. The MISTY 1 is common key encryption with a block length of 64 bits and a key length of 128 bits. The MISTY 1 is publicly opened, for example, on the home page of IPA (Information-technology Promotion Agency) (see Non-patent document 1).

FIG. 1 is a basic configuration of a MISTY 1 encryption process. FIG. 1 is obtained by simplifying FIG. 1A of Non-patent document 1.

As illustrated in FIG. 1, MISTY 1 is Feistel type encryption. The MISTY 1 includes an FL function 10, an FO function 20 and an exclusive OR 30, and is composed by combining these components. In the MISTY 1, a first Feistel structure 100 including two FL functions 10, one FO function 20 and one exclusive OR 30 and a second Feistel structure 200 including one FO function and one exclusive OR 30 are alternately vertically multi-stage-connected. The number n of stages of the MISTY 1 is regulated to be a multiple of four and n=8 is recommended.

As illustrated in FIG. 1, in the MISTY 1, the first Feistel structure 100 is assigned to the odd number and the second Feistel structure 200 is assigned to the even number. The first Feistel structure 100 and the second Feistel structure 200 both include an FO function 20.

Next, a Feistel structure will be briefly explained. The Feistel structure is configured in such a way as to divide an input into two of left and right blocks, to input one block on the L side (hereinafter called a "block L") to an F function (FO function 20 in the case of MISTY 1), to calculate the exclusive OR of the output of the F function and the other block on the R side (hereinafter called a "block R") and to replace the blocks L and R with each other after the completion of the logic calculation process.

In the case of MISTY 1, the first Feistel structure 100 applies the processes of an FL function 10L (FL1) and an FL function 10R (FL2) to the blocks L (32 bits) and the blocks R (32 bits) to the block R (32 bits), respectively, and inputs the process results to the exclusive OR 30. Then, the process result of the FL function 10L and the logical calculation result of the exclusive OR 30 are outputted to a Feistel structure 200 in a subsequent stage as blocks R and L, respectively.

The second Feistel structure 200 inputs the blocks L and R to the FO function 20 and the exclusive OR 30, respectively. Then, the exclusive OR of the above process result of the FO function 20 and the above block R is calculated by the exclusive OR 30 and the logical calculation result and the above block L are outputted to outside. In this case, the above block and the above logical calculation result are inputted to a Feistel structure in a subsequent structure 100 as blocks R and L, respectively.

The FL functions 10 and 20 are a key-dependent non-linear function and a non-linear function, respectively. The FL function 10 is a function in a Feistel structure which converts 32-bit input data to 32-bit data using a 32-bit extended key KL, which is not illustrated, and outputs it. The FO function 20 is the function of a MISTY structure which converts 32-bit input data to 32-bit data using a 64-bit extended key KO, which is not illustrated, and a 48-bit extended key KI, which is not illustrated, and outputs it. As described later, the FO function 20 includes three FI functions inside. This FI function is a non-linear function.

It is important that an encryption device mounted on a small-size device has a small circuit scale. Especially, a circuit scale is emphasized in an embedded micro-controller with an encryption function, an encryption hard accelerator and the like. Therefore, when a common key encryption algorithm in which a MISTY structure is often used, such as MISTY1, KASUMI or the like is implemented by hardware, in order to reduce the circuit scale of the hardware, it is very effective to reduce the circuit scale of an FO function.

FIG. 2A is a "structure 300 including an FO function 20 and an exclusive OR 30 connected to it" extracted from the structure of MISTY 1 in FIG. 1. The structure 300 illustrated in FIG. 2A is a component provided for both of the first Feistel structure 100 and the second Feistel structure 200.

The configuration/operation of the structure 300 will be explained. The structure 300 inputs the data of a 32-bit block L and the data of a 32-bit block R. The data of a 32-bit block L is outputted to outside without applying any process to it and also is inputted to the FO function 20. The FO function 20 converts the data of the block L to 32-bit data using a 64-bit extended key KO, which is not illustrated, and a 48-bit extended key KI, which is not illustrated, and outputs the conversion result to the exclusive OR 30. The exclusive OR 30 calculates the exclusive OR of the data of the block R and the output of the FO function 20 and outputs the logical calculation result (32-bit data) to outside. The structure 300 outputs the inputted data of block L to outside without applying any process to it.

FIG. 2B is a structure obtained by rotating the structure 300 illustrated in FIG. 2A by 90 degrees clockwise. When the FO function inside the structure 310 illustrated in FIG. 2B is developed, a structure illustrated in FIG. 2C is obtained.

The summary of a structure 320 illustrated in FIG. 2C is disclosed as FOi in FIG. 2 of Non-patent document 1. The structure 320 divides the data of a 32-bit block L being one input data into data LL of its higher-order 16 bits and data LR of its lower-order 16 bits. The data of a 32-bit block R being the other input data is also divided into data RL of its higher-order 16 bits and data RR of its lower-order 16 bits. The FO function 20 uses keys KOi1 through KOi4 (16 bits each) being partial bits of a private key K (128 bits) as one input of an exclusive OR 321 provided in the pre-stage of the FI function. Furthermore, extended keys KIi1 through KIi3 (16 bits each) obtained by extracting partial bits from the private key K and applying an extended key generation process to the bits are used for the keys of FI functions (FIi1-FIi3). How to generate the extended keys KOi1 through KOi4 and KIi1 through KIi3 is disclosed in Non-patent document 1. The FO function is the function of a MISTY structure. One of the keys KOi1 through KOi4 and the keys KIi1 through KIi3 is sometimes simply described as a key.

When the structure 320 illustrated in FIG. 2C is analyzed from the viewpoint of a process algorithm, a structure illustrated in FIG. 3 is obtained. In the structure 330 illustrated in FIG. 3 it is assumed that the data (32 bits) of blocks L and R being input data are stored in registers Reg-L and Reg-R, respectively.

The entire process of the FO function 20 can be divided into three cycle of processes which are separated by thick horizontal broken lines in FIG. 3. These three cycles are sequentially called here as a cycle 1, a cycle 2 and a cycle 3. Since the process procedures of the cycles 1 through 3 are almost the same, apart enclosed with a broken-line rectangular frame in FIG. 3 (cycle 1 process unit) can be unitized as hardware and the unit 500 can be commonly used for the respective cycles of processes. Specifically, the processes of cycles 1 through 3 can be performed by performing the above unit 500 three times one after another. Strictly speaking, the process procedures of the cycle 1 and 2 are the same. The cycle 3 calculates the exclusive OR of the process result of the cycle 2 and the key KOi4 by the exclusive OR 321 in addition to the processes of the other cycles (cycles 1 and 2). The structure of the unit 500 is generally called a "MISTY structure". In the basic configuration of the MISTY structure, an F function (FI function in the case of unit 500) and an exclusive OR are arranged in a left system data path in that order and the above exclusive OR calculates the exclusive of the output of the F function and data branched and inputted from the right system data path. The above output of the exclusive OR is inputted to the right system data path and the data of the right system data path, inputted to the above exclusive OR is inputted to the left system data path in a subsequent stage. In the MISTY structure of the FO function, a first exclusive OR to which a round key KOij (j=1-3) is inputted is arranged on the left system data path, an FI function to which a round key KIij (j=1-3) is arranged in its lower section and a second exclusive OR is arranged its further lower section. Then, the exclusive OR of the output of the FI function and data branched and inputted from the right system data path is calculated by the second exclusive OR. Then, the calculation result of the second exclusive OR is inputted to the right system data path in a subsequent stage. Data flowing through the right system data path in the previous stage is inputted to the left system data path in a subsequent stage. Although the configuration of a MISTY structure is explained above using the MISTY structure of an FO function as an example, there are various forms of MISTY structures obtained by transforming the above basic configuration in data conversion functions other than the FO function, such as an FI function and the like. FIG. 4 is a conventional circuit provided with the function of the unit 500 illustrated in FIG. 3.

The circuit 510 illustrated in FIG. 4 can perform the process of the algorithm illustrated in FIG. 2C. Specifically, the process of an FO function and the process of the exclusive OR of the process result of the FO function and data R can be also possible.

The circuit 510 includes four registers Reg-L, Reg-FOL, Reg-FOR and Reg-R, two multiplexers 511L and 511R, two de-multiplexers 512L and 512R and five exclusive OR calculators 521-525.

The register Reg-L is a 32-bit register and stores 32-bit input data processed by the FO function 20. The higher-order 16 bits (LL) of the data stored in the register Reg-L and the lower-order 16 bits (LR) are inputted to the multiplexers 511L and 511R, respectively. The 16-bit data stored in the register Reg-FOL is also inputted to the multiplexer 511L. The multiplexers 511L selectively outputs the 16-bit data inputted from either the register Reg-L or Reg-FOL to an exclusive OR calculator 521. The exclusive OR calculator 521 calculates the exclusive OR of the 16-bit data inputted from the multiplexer 511L and a 16-bit key KOij (j=1-3) inputted from outside and outputs the calculation result to an FI function processing unit 530. The FI function unit 530 outputs the process result (16-bit data) to an exclusive OR calculator 522. The multiplexer 511R inputs the 16-bit data stored in the register Reg-FOR, selectively outputs 16-bit data inputted from either the register Reg-L or Reg-R to the exclusive OR calculator 522 and the de-multiplexer 512L. The exclusive OR calculator 522 calculates the exclusive OR of the output data (16 bits) of the FI function processing unit 530 and 16-bit data inputted from the multiplexer 511R and outputs the calculation result to the de-multiplexer 512R.

Thus, a circuit including the exclusive OR calculators 521 and 522 provided between the multiplexers 511L and 511R and the de-multiplexers 512L and 512R and the FI function processing unit 530 (circuit 600 enclosed with a broken-line rectangular frame in FIG. 4) has a MISTY structure. Therefore, 16-bit data on the L side (left side), outputted from the de-multiplexer 512L and 16-bit data on the R side (right side), selectively outputted from the multiplexer 511R are replaced with each other by the circuit 600 of a MISTY structure.

The de-multiplexer 512L selectively outputs 16-bit data inputted from the multiplexer 511R to either the register Reg-FOL or the exclusive OR calculator 523. The register Reg-FOL stores 16-bit data inputted from the de-multiplexer 512L and outputs the data to the multiplexer 511L. The exclusive OR calculator 523 is provided to calculate the exclusive OR of an extended key KOi4 in the process of the cycle 3 and an exclusive OR calculation result t3 (see FIG. 2C) in the cycle 2. The logical calculation result of the exclusive OR calculator 523 is outputted to an exclusive OR calculator 524. The higher-order 16 bits (RL) of the 32-bit data R stored in the register Reg-R is also inputted to the exclusive OR calculator

524. The calculation result (16 bits) of the exclusive OR calculator 524 is stored in the register Reg-R as higher-order 16 bit data (RR).

The de-multiplexer 512R outputs the logical calculation result (16 bits) of the exclusive OR calculator 522 to either the register Reg-FOR or the exclusive OR calculator 525. The register Reg-FOR stores 16-bit data inputted from the de-multiplexer 512R and outputs the data to the multiplexer 511R. The exclusive OR calculator 525 calculates the exclusive OR of the lower-order 16 bits (RR) of the 32-bit data R stored in the register Reg-R and input data from the de-multiplexer 512R and outputs the calculation result (16-bit data) to the register Reg-R. The register Reg-R stores 16-bit data inputted from the exclusive OR calculator 525 as the lower-order 16-bit data (RR) of the 32-bit data R and outputs the data RR to the exclusive OR calculator 525.

Thus, a conventional circuit for an FO function and its peripheral circuit (circuit for calculating the exclusive OR of the output of the FO function and data R) requires two registers Reg-FOL and Reg-FOR for storing 16-bit data for the process of the FO function. Specifically, a circuit for an FO function and its peripheral circuit (hereinafter called a "FO function-related processing circuit" for convenience' sake) requires a total 32-bit register for an FO function.

[Algorithm of MISTY 1]

In MISTY 1, a plaintext 1 (64 bits) are divided into two 32 bits. In this case, 32 bits on the MSB (most significant bit) side and 32 bits on the LSB (least significant bit) side are called as L and R, respectively. The respective pieces of divided data L and R are inputted to the first-stage FL functions 10 on the left and right sides, respectively. Then, the output (32 bits) of the above FL functions 10 on the left side is inputted to the first-stage FO function 20 and the output (32 bits) of the above FL functions 10 on the right side becomes one input of the first-stage exclusive OR 30. The output (32 bits) of the first-stage FO function 20 becomes other input of the first-stage exclusive OR 30. The result (32 bits) of the first-stage exclusive OR 30 is inputted to the second-stage FL function 10 on the left side and the second-stage FO function 20. The output (32 bits) of the first-stage FL function 10 on the left side becomes one input of the second-stage exclusive OR 30. The other input of this second-stage exclusive OR 30 is outputted to the above second-stage FO function 20.

[Conventional Process Algorithm of FO Function-Related Processing Circuit]

Next, the process algorithm of an FO function-related processing circuit using a circuit 510 illustrated in FIG. 4 will be explained with reference to FIG. 2C. The following in the right term of each cycle is a symbol indicating an exclusive OR calculation.

$$\oplus \quad \text{[Expression 1]}$$

This also applies to logical calculation expressions hereinafter. FI (a, KIij) indicates an FI function process for converting input data 'a' by an extended key KIij (j=1-3).

[Cycle 1]

$$t1=FI((LL \oplus KOi1),KIi1) \oplus LR \text{ (to be stored in register Reg-}FOR)$$

$$t2=LR \text{ (to be stored in register Reg-}FOL) \quad \text{[Expression 2]}$$

[Cycle 2]

$$t3=FI((t2 \oplus KOi2),KIi2) \oplus t1 \text{ (to be stored in a register Reg-}FOR)$$

$$t4=t1 \text{ (to be stored in a register Reg-}FOL) \quad \text{[Expression 3]}$$

[Cycle 3]

$$RR=FI((t4 \oplus KOi3),KIi3) \oplus t3 \oplus RR \text{ (to be stored in the lower-order 16 bits of register Reg-}R) \quad \text{[Expression 4]}$$

$$RL=KOi4 \oplus t3 \oplus RL \text{ (to be stored in the higher-order 16 bits of register Reg-}R) \quad \text{[Expression 5]}$$

As described above, it is necessary that the conventional circuit 510 stores the process results $t_{2i-1}$ and $t_{2i}$ (i=1-2) of the cycles 1 and 2 in the registers Reg-FOR and Reg-FOL, respectively. However, since the gate scale per bit of a register is larger than that of other devices, in order to reduce the scale of the entire circuit of an encryption device to which MISTY 1 is applied, is preferable to reduce the size of a register as much as possible. This applies to not only MISTY 1 but also a circuit of a block cipher processing device of common key block encryption system having a circuit configuration similar to MISTY 1, such as KASUMI and the like.

FIG. 5 is a flowchart illustrating the software process of the above process algorithm ALp. This software process is performed by a CPU provided with an embedded micro-computer or the like. Data LR, LL, RR and RL and keys KOi1-KOi4 and KIi1-LIi3 which are used in the process of the following flowchart are stored in the register or memory in the CPU.

The process of the flowchart illustrated in FIG. 5 will be explained.

Firstly, the following cycle 1 process of the above process algorithm ALp is performed and the process result is stored in a register A (S1).

$$FI((LL \oplus KOi1),KIi1) \oplus LR \quad \text{[Expression 6]}$$

The register A is one of general registers provided for the CPU.

Then, the following cycle 2 process of the above process algorithm ALp is performed and the process result is stored in a register B (S2).

$$FI((t2 \oplus KOi2),KIi2) \oplus (\text{contents of register } A) \quad \text{[Expression 7]}$$

Then, lastly, the following cycle 3 process of the above process algorithm ALp is performed and the process result is stored in a "register storing RR".

$$FI((t4 \oplus KOi3),KIi3) \oplus (\text{Contents of register } B) \oplus (\text{Contents of register storing } RR) \quad \text{[Expression 8]}$$

Then, the following second cycle 3 process of the above process algorithm ALp is performed and the process result is stored in a "register storing RL".

$$KOi4 \oplus (\text{Contents of register } B) \oplus (\text{Contents of register storing } RL) \quad \text{[Expression 9]}$$

Thus, a 64-bit plaintext is encoded into a 64-bit ciphertext.

FIG. 6 is an example of a program expressing the process of the flowchart illustrated in FIG. 5 by an assembler language. In the program illustrated in FIG. 6, the FI function process is realized by a program (FI-related process function). This FI-related process function is called up from a main program (main routine) illustrated in FIG. 6 as a sub-routine. In FIG. 6, the call-up of this sub-routine is expressed as the following descriptive statement.

Call FI (a, KIij)

j=1-3

The Call FI(a, KIij) is "a process for performing an FI function (FI-related process function) using 'a' input data (data to be converted) and KIij as and data conversion key and the process result of the FI function is stored in 'a'".

In the program description illustrated in FIG. 6, "MOV" indicate a data transfer instruction and "XOR" indicate an exclusive OR calculation instruction. The operand 'a' of these instructions and the argument 'a' of the call instruction indicate the register A. The MOV instruction instructs to transfer data specified in a second operand to the register of a first operand. For example, "MOV a, LL" is an instruction to transfer data stored in the register LL to the register A. In addition, "MOV a, [LL]" is an instruction to access a memory address storing data LL and to transfer the data LL from the memory to the register A.

As known from the program description illustrated in FIG. 6, the conventional FO function process program (software) uses two registers (registers A and B) in order to store intermediate data in the course of the data conversion process of a general register provided for the CPU.

Patent document 1: Japanese Laid-open Patent Publication No. 2004-240427

Patent document 2: Japanese Patent No. 3088337 Non-patent document 1: Encryption Technical Specification MISTY 1

Non-patent document 2: Mitsuru Matsui, "Block Cipher Algorithm MISTY", Technical Report of IEICE, ISEC96-11 (July 1996)

SUMMARY

It is an object of the present invention to reduce the circuit scale of a data conversion function processor having a MISTY structure used in a block cipher than ever.

The encryption device of the present invention presumes including a data processing unit for converting 2n-bit data L and an exclusive OR calculator for calculating the exclusive OR of the process result of the data processing unit and 2n-bit data R.

The first embodiment of the encryption device includes a first register to store n-bit data; a first multiplexer to selectively output one of the n-bit data stored in the first register, the higher-order n bits LL of the data L and lower-order n bits LR of the data L; a first exclusive OR calculator to calculate an exclusive OR of an output of the first multiplexer and a round key KOij (j=natural number); a first data processing unit to convert an output of the first exclusive OR calculator to n-bit data, using an extended key KIik (k=natural number); a second multiplexer to selectively output one of lower-order n bits LR of the data L, n-bit "0" data and n-bit data stored in the first register; a second exclusive OR calculator to calculate an exclusive OR of an output of the second multiplexer and an output of the first data processing unit; a de-multiplexer to output an output of the second exclusive OR calculator to the first register; a third multiplexer to selectively output one of an output of the second exclusive OR calculator or a round key KOim (m=natural number); a second register to store the data R; a third exclusive OR calculator to calculate an exclusive OR of higher-order n bits RL of data R stored in the second register and an output of the third multiplexer; and a fourth exclusive OR calculator to calculate an exclusive OR of an output of the second multiplexer and lower-order n bits RR of data R stored in the second register. Then the first multiplexer, the second multiplexer, the third multiplexer and the de-multiplexer are externally controlled. The first register inputs and stores an output of the de-multiplexer. The second register stores an output of the third exclusive OR calculator and an output of the fourth exclusive OR calculator as higher-order n bits RL and lower-order n bits RR of data R, respectively.

The second embodiment of the encryption device includes a first register to store n-bit data; a first multiplexer to selectively output one of n-bit data stored in the first register, higher-order n bits LL of the data L and lower-order n bits LR of the data L; a first exclusive OR calculator to calculate an exclusive OR of an output of the first multiplexer and a round key KOij (j=natural number); a first data processing unit to convert an output of the first exclusive OR calculator to n-bit data, using an extended key KIik (k=natural number); a second multiplexer to selectively output one of lower-order n bits LR of the data L and n-bit "0" data; a second exclusive OR calculator to calculate an exclusive OR of an output of the second multiplexer and an output of the first data processing unit; a third multiplexer to selectively output one of an output of the second exclusive OR calculator and a round key KOim; a second register to store the data R; a third exclusive OR calculator to calculate an exclusive OR of higher-order n bits RL of data R stored in the second register and an output of the third multiplexer; and a fourth exclusive OR calculator to calculate an exclusive OR of an output of the second exclusive OR calculator and lower-order n bits RR of the data R stored in the second register. Then the first multiplexer, second multiplexer and third multiplexer are externally controlled. The first register inputs and stores an output of the second exclusive OR calculator. The second register stores an output of the third exclusive OR calculator and an output of the fourth exclusive OR calculator as higher-order n bits RL and lower-order n bits RR of the data R, respectively.

The third embodiment of the encryption device includes a first register to store n-bit data; a first multiplexer to selectively output one of n-bit data stored in the first register, higher-order n bits LL of the data L and lower-order n bits LR of the data L; a first exclusive OR calculator to calculate an exclusive OR of an output of the first multiplexer and a round key KOij (j=natural number); a first data processing unit to convert an output of the first exclusive OR calculator to n-bit data, using an extended key KIik (k=natural number); a second multiplexer to selectively output one of lower-order n bits LR of the data L and a n-bit round key KOim (m=natural number); a second exclusive OR calculator to calculate an exclusive OR of an output of the second multiplexer and an output of the first data processing unit; an output unit to input an output of the second exclusive OR calculator and output the input with appropriate timing; a second register to store the data R; a third exclusive OR calculator to calculate an exclusive OR of higher-order n bits RL of the data R stored in the second register and an output of the switch unit; and a fourth exclusive OR calculator to calculate an exclusive OR of an output of the second exclusive OR calculator and lower-order n bits RR of the data R stored in the second register. Then the first multiplexer, second multiplexer and the output unit are externally controlled. The first register inputs and stores an output of the second exclusive OR calculator. The second register stores an output of the third exclusive OR calculator and an output of the fourth exclusive OR calculator as higher-order n bits RL and lower-order n bits RR of the data R, respectively.

In the third embodiment of the above encryption device, for example, the output unit is a third multiplexer for selectively outputting one of an n-bit "0" data and the output of the second exclusive OR calculator.

The fourth embodiment of the encryption device further includes a third register to input, store and output the data L in one of the above first through third embodiments of the encryption device.

According to the encryption devices of the present invention, by controlling multiplexers and a de-multiplexer, the exclusive ORs of the n-bit process result of a data processing unit which should be conventionally stored in a register and each of the higher-order 16 bits RL and lower-order 16 bits RR of the 2n-bit data R are calculated instead of storing the n-bit process result in the first register. Thus, the size (register length) of the first register can be made n bits. Therefore, the register size can be halved compared with the conventional encryption device to reduce the circuit scale.

The encryption method of the present invention presumes converting 2n-bit data L, calculating the exclusive OR of the data conversion result and 2n-bit data R and outputting the exclusive OR calculation result.

The first embodiment of the encryption method includes a step of a cycle 1 of calculating an exclusive OR of higher-order n bits LL of the data L and a round key KOi1, converting a logical calculation result of the exclusive OR, using an extended key KIi1, calculating an exclusive OR of the data conversion result and lower-order n bits LR of the data L and outputting logical calculation result t1 of the exclusive OR; a step of a cycle 2 of calculating an exclusive OR of lower-order n bits LR of the data L and a round key KOi2, converting a logical calculation result of the exclusive OR, using an extended key KIi2, calculating an exclusive OR of the data conversion result and a logical calculation result t1 outputted in the step of the cycle 1, calculating an exclusive OR of a logical calculation result t3 of the exclusive OR and lower-order n bits RR of the data R and outputting a logical calculation result of the exclusive OR as new lower-order n bits RR, and calculating an exclusive OR of the logical calculation result t3 and higher-order n bits RL of the data R and outputting the logical calculation result as new higher-order n bits RL; and a step of a cycle 3 of calculating an exclusive OR of the exclusive OR calculation result t1 and a round key KOi3, converting a logical calculation result of the exclusive OR, using an extended key KIi3, calculating an exclusive OR of the data conversion result and lower-order n bits RR generated in the cycle 2 and outputting a logical calculation result of the exclusive OR as new lower-order n bits RR, and calculating an exclusive OR of higher-order n bits RL outputted in cycle 2 and a round key KOi4 and outputting a logical calculation result of the exclusive OR as new higher-order n bits RL.

The second embodiment of the encryption method includes a step of a cycle 1 of calculating an exclusive OR of higher-order n bits LL of the data L and a round key KOi1, converting a logical calculation result of the exclusive OR, using an extended key KIi1, calculating an exclusive OR of the data conversion result and lower-order n bits LR of the data L, calculating an exclusive OR of a logical calculation result t1 of the exclusive OR and lower-order n bits RR of the data R and outputting the logical calculation result of the exclusive OR as new lower-order n bits RR of the data R, and calculating an exclusive OR of a logical calculation result t1 and higher-order n bits RL and outputting the logical calculation result of the exclusive OR as new higher-order n-bits RL; a step of a cycle 2 of calculating an exclusive OR of the lower-order n bits LR of data L and a round key KOi2, converting a logical calculation result of the exclusive OR, using a key KIi2, calculating an exclusive OR of the data conversion result t3 and RL outputted in the cycle 1 and outputting the exclusive OR of the data conversion result t3 and RL as RL, and further calculating an exclusive OR of t3 and RR outputted in the cycle 1 and outputting the exclusive OR of t3 and RR as RR; and a step of a cycle 3 of calculating an exclusive OR of the logical calculation result t1 and a round key KOi3, converting a logical calculation result of the exclusive OR, using a key KIi3, calculating an exclusive OR of the data conversion result and lower-order n bits RR generated in the cycle 2 and outputting the logical calculation result of the exclusive OR as new lower-order n bits RR, calculating the exclusive OR of higher-order n bits RL outputted in cycle 2 and a round key KOi4 and outputting the logical calculation result of the exclusive OR as new higher-order n bits RL.

The third embodiment of the encryption method includes a step of a cycle 1 of calculating an exclusive OR of higher-order n bits LL of the data L and a round key KOi1, converting the exclusive OR calculation result, using a key KIi1, calculating an exclusive OR of the data conversion result and lower-order n bits LR of the data L, calculating an exclusive OR of the exclusive OR calculation result t1 and lower-order n bits RR of the data R and outputting the logical calculation result of the exclusive OR as new lower-order n bits RR, and calculation an exclusive OR of a logical calculation result t1 and higher-order n bits RL of the data R and outputting the logical calculation result of the exclusive OR as new higher-order n bits RL; a step of a cycle 2 of calculating the exclusive OR of the lower-order n bits LR of the data L and a round key KOi2, converting the data of the logical calculation result of the exclusive OR, using a key KIi2, calculating an exclusive OR of the data conversion result and a round key KOi4, calculating an exclusive OR of a logical calculation result t3 of the exclusive OR and lower-order n bits RR of the data R and outputting the logical calculation result of the exclusive OR as new lower-order n bits RR, and calculating an exclusive OR of the logical calculation result t3 and higher-order n bits RL of the data R and outputting the logical calculation result of the exclusive OR as new higher-order n bits RL of the data R; and a step of a cycle 3 of calculating an exclusive OR of the exclusive OR calculation result t1 and a round key KOi3, converting the logical calculation result of the exclusive OR, using an extended key KIi3, calculating an exclusive OR of the data conversion result and lower-order n bits RR generated in the cycle 2, calculating an exclusive OR of the logical calculation result of the exclusive OR and a round key KOi4 and outputting the logical calculation result of the exclusive OR as new lower-order n bits RR, and outputting higher-order n bits RL outputted in the cycle 2.

According to the encryption methods of the present invention, no process of storing the exclusive OR calculation result t3 in a register is needed. Therefore, the circuit scale can be reduced compared with the conventional encryption method.

The MISTY structure is one type of Feistel structures.

BRIEF DESCRIPTION OF DRAWINGS

FIG. 3 is a view obtained by analyzing the structure illustrated in FIG. 2C from the viewpoint of a hardware process.

FIG. 6 is an example of a program expressing the process of the flowchart illustrated in FIG. 5 by an assembler language.

FIG. 9A illustrates the conventional process algorithm of the FO function-related processing circuit.

FIG. 10A is a view obtained by dividing FIG. 9B in relation to cycles 1 through 3 of the process algorithm in the second preferred embodiment of the present invention.

FIG. 10B is a configuration example of the FO function-related processing circuit in the second preferred embodiment of the present invention.

FIG. 11A illustrates the process algorithm of the FO function-related processing circuit in the second preferred embodiment of the present invention.

FIG. 12 is a configuration example of the FO function-related processing circuit in the third preferred embodiment of the present invention.

FIG. 15 is the third configuration of an embedded device in the preferred embodiment of the present invention.

FIG. 16 is a flowchart illustrating the algorithm of software (a program) installed in the embedded device having the first configuration in order to realize the function of the FO function-related processing circuit in the first preferred embodiment of the present invention.

FIG. 17 is a preferred embodiment of the program operating in the algorithm illustrated in FIG. 16.

FIG. 19 is a preferred embodiment of the program operating in the algorithm illustrated in FIG. 18.

FIG. 20 is a flowchart illustrating the algorithm of software (a program) installed in the embedded device having the first configuration in order to realize the function of the FO function-related processing circuit in the third preferred embodiment of the present invention.

FIG. 21 is a preferred embodiment of the program operating in the algorithm illustrated in FIG. 20.

DESCRIPTION OF EMBODIMENTS

Figure 1:
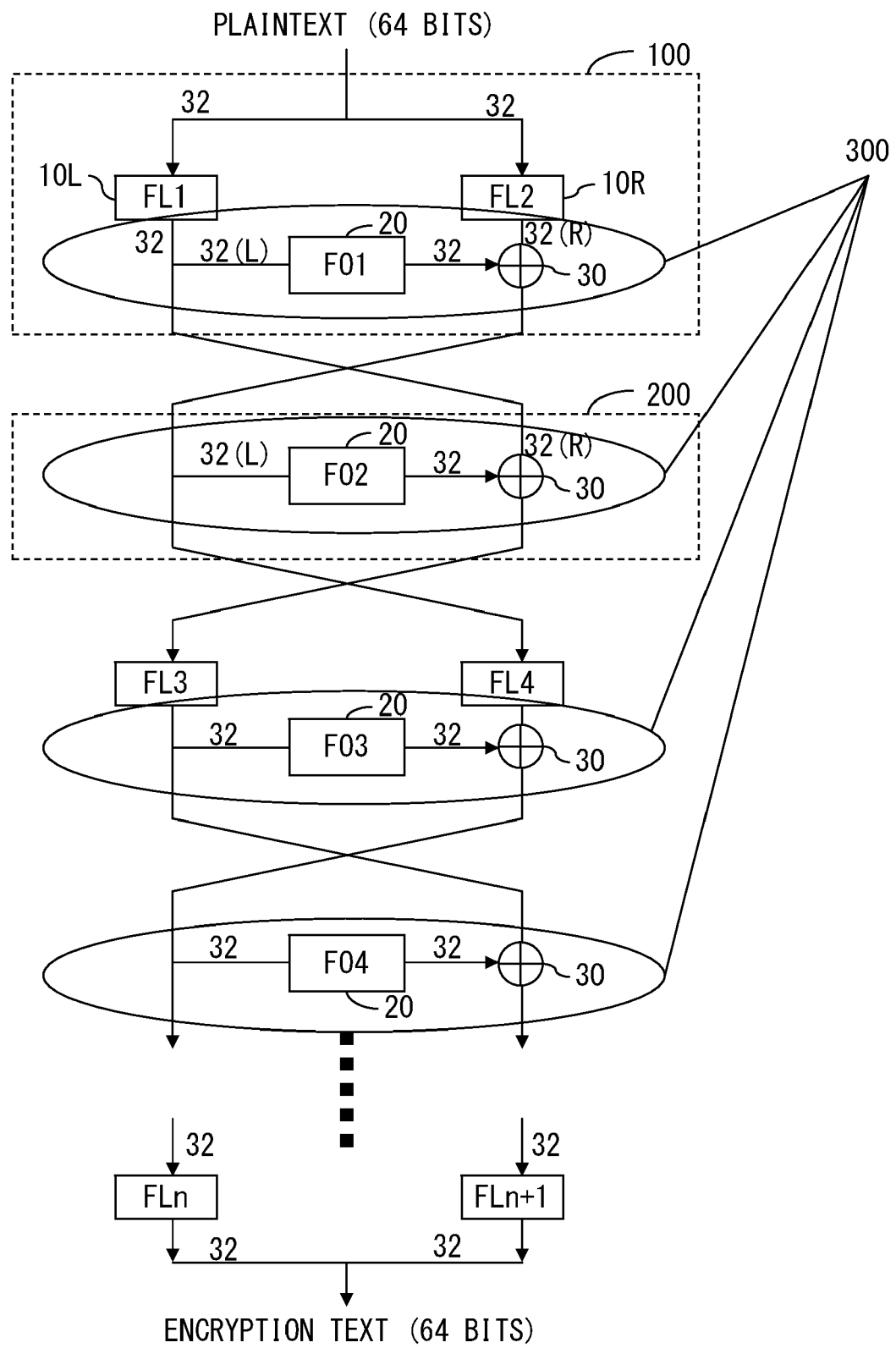
FIG. 1 is a basic configuration of a MISTY1 encryption process.
Figure 2A:
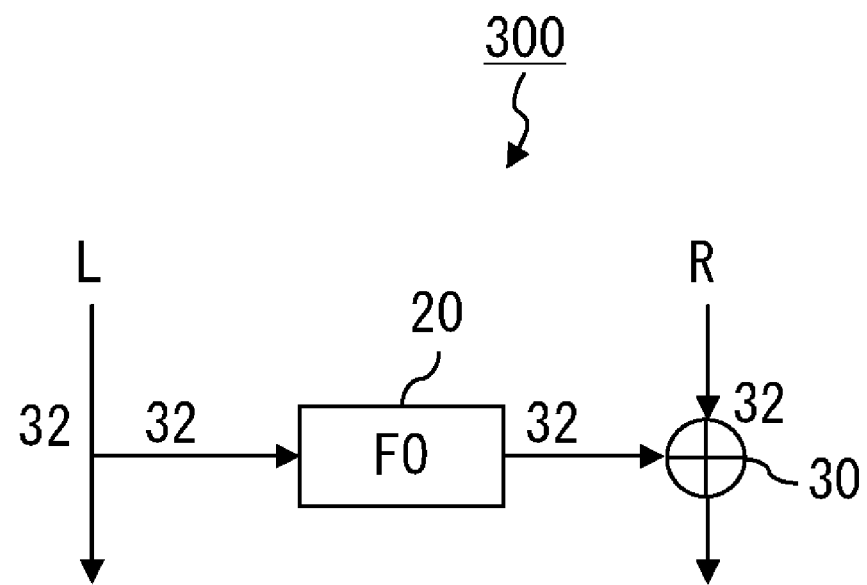
FIG. 2A is a structure around an FO function extracted from the MISTY 1 structure illustrated in FIG. 1.
Figure 2B:
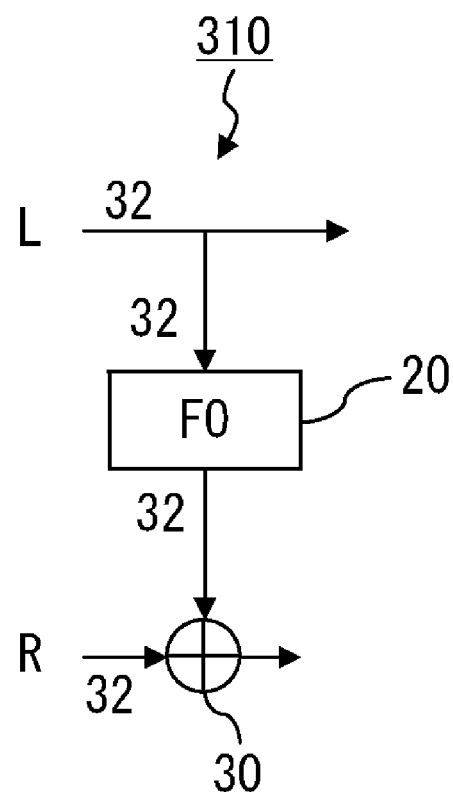
FIG. 2B is a structure obtained by rotating the structure around the FO function illustrated in FIG. 2A by 90 degrees clockwise.
Figure 2C:
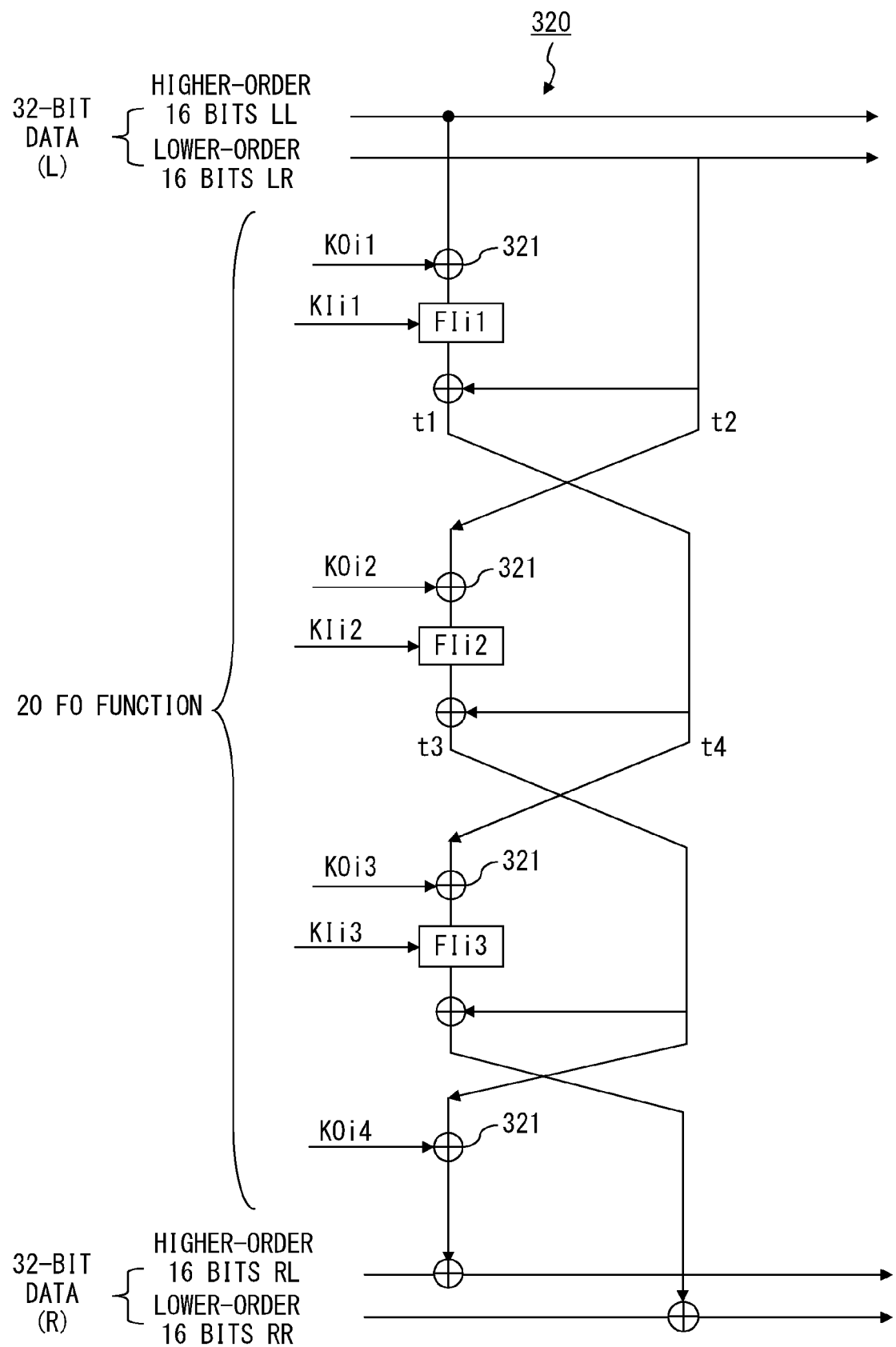
FIG. 2C is a view obtained by developing the FO function inside the structure illustrated in FIG. 2B.

This preferred embodiment is designed to reduce the size a register used in a functional circuit (device) having the MISTY structure illustrated in FIG. 2C, using a rule that the calculation order of an exclusive OR calculation can be changed.

The preferred embodiment of the present invention will be explained below with reference to the drawings. Although in all the following preferred embodiments, the present invention is applied to an FO function-related processing circuit, the present invention is not limited to the FO function-related processing circuit and is also applicable to circuits having a MISTY structure including F functions other than the FO function. The block length is not also limited to 64 bits. The bit lengths of a private key and an extended key are not also limited to this preferred embodiment.

First Embodiment

Method

Figure 7A:
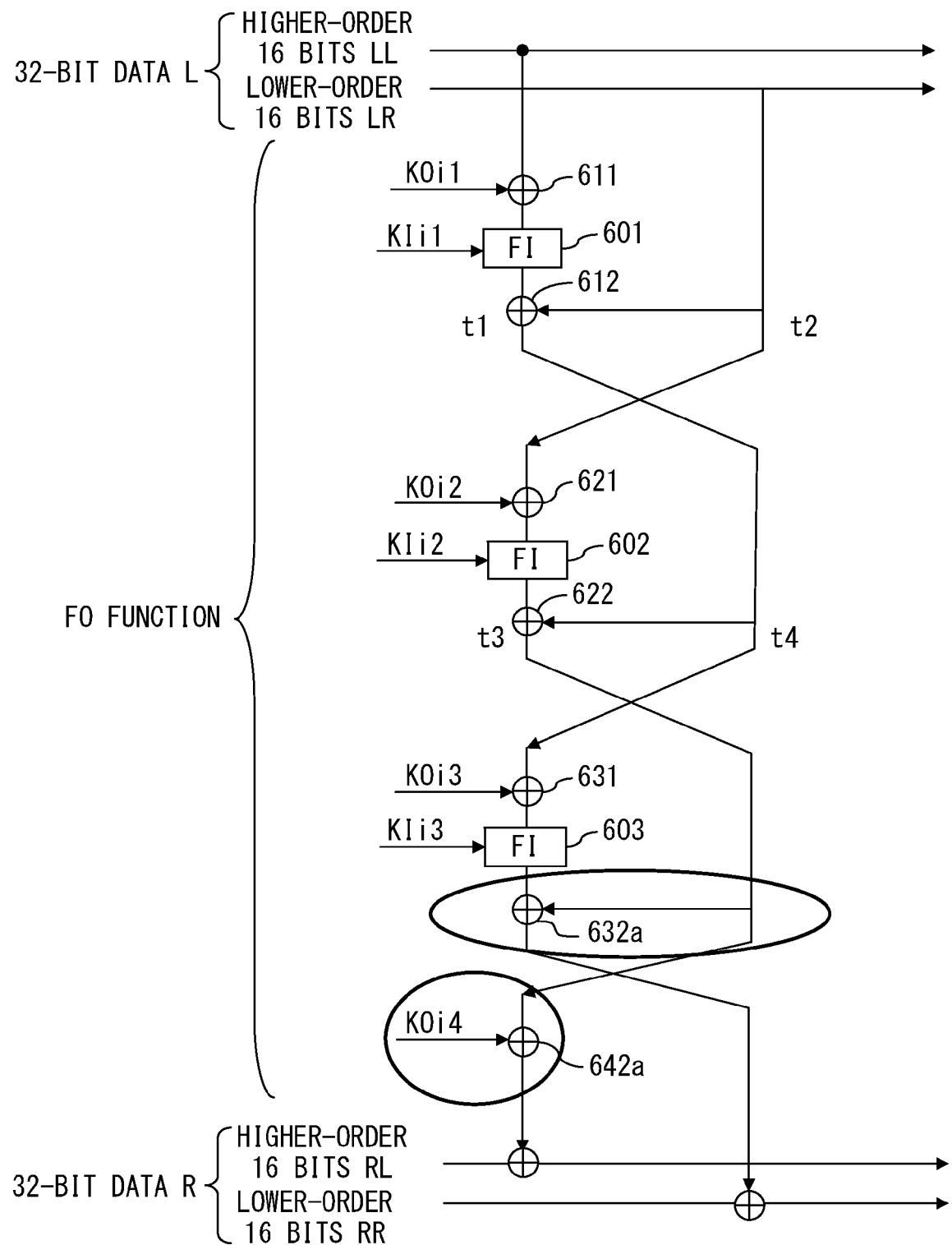
FIG. 7A illustrates the conventional process algorithm of the FO function-related processing circuit.
Figure 7B:
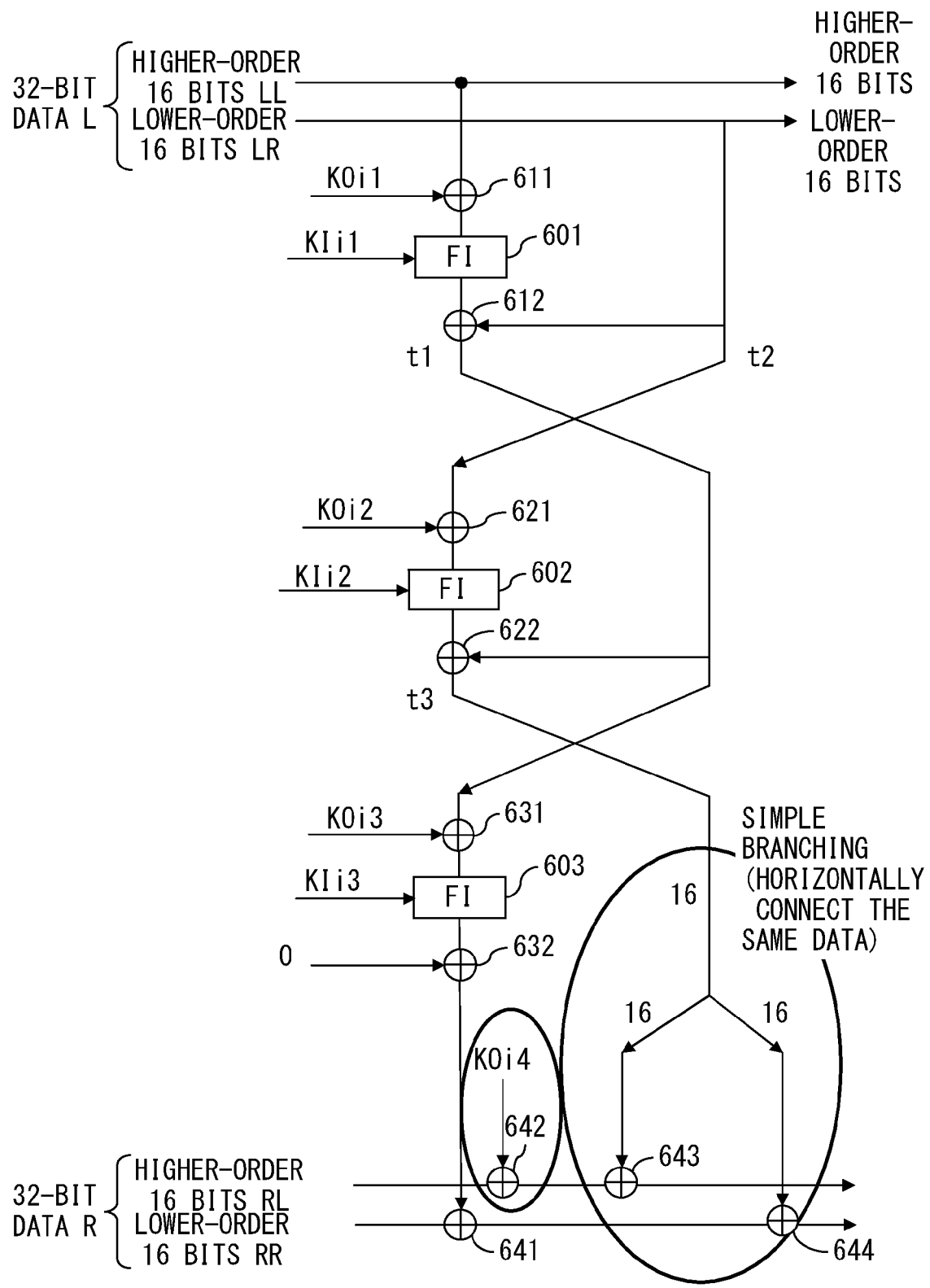
FIG. 7B illustrates a process algorithm of the FO function-related processing circuit in the first preferred embodiment of the present invention.

FIGS. 7A and 7B explain the method of the first preferred embodiment of the present invention. FIG. 7A is the same as FIG. 2C and illustrates the conventional process algorithm of the FO function-related processing circuit.

In this preferred embodiment, the conventional structure of the FO function-related processing circuit illustrated in FIG. 7A is equivalently converted to the structure illustrated in FIG. 7B. In particular, the structure surrounded by two ellipsoidal frames in FIG. 7A is equivalently converted to the structure surrounded by two ellipsoidal frames in FIG. 9B.

As illustrated in FIG. 7A, the FO function has three stages of MISTY structures. The first stage includes an exclusive OR 611, an FI function 601 and an exclusive OR 612. The second stage includes an exclusive OR 621, an FI function 602 and an exclusive OR 622. The third stage includes an exclusive OR 631, an FI function 603 and an exclusive OR 632a. The FO function further includes an exclusive OR 642a for calculating the exclusive OR of the output t3 of the second-stage exclusive OR 622 in the second stage and a key KOi4.

In the equivalent conversion illustrated in FIG. 7B, firstly, the exclusive OR of the output of the third-stage (cycle 3) FI function 603 and "0" is calculated instead of calculating the exclusive OR of the output of the third-stage (cycle 3) FI function 603 and the second-stage (cycle 2) output t3 (output of the second exclusive OR 622) (exclusive OR 632). The exclusive OR of the output of the exclusive OR 632 and RR is calculated (exclusive OR 641). The exclusive OR of a key KOi4 and RL is also calculated (exclusive OR 642). Furthermore, t3 is simply branched and the exclusive OR of t3 and the output of the exclusive OR 642 is calculated (exclusive OR 643). The exclusive OR of t3 and the output of the exclusive OR 641 is also calculated (exclusive OR 644).

Even when the exclusive OR 632 is calculated, the result of the FI function processing unit 603 is outputted as it is. Therefore, the exclusive OR 632 can also be omitted.

As described above, by configuring the process algorithm of the FO function-related processing circuit as illustrated in FIG. 7B, the size of a register used in this circuit can be reduced to half of the conventional one when the FO function-related processing circuit is made hardware. Such a hardware preferred embodiment will be described later.

Process Algorithm AL1 of FO Function-Related Processing Circuit in First Embodiment A process algorithm AL1 illustrated in FIG. 7B includes the following cycles 1 through 3.

[Cycle 1]

$t1=FI((LL \oplus KOi1), KIi1) \oplus LR$ (to be stored in register Reg-FOR) [Expression 10]

(Store t1 in register)

[Cycle 2]

$t3=FI((LR \oplus KOi2), KIi2) \oplus t1$ $RR=t3 \oplus RR$ $RL=t3 \oplus RL$ [Expression 11]

(Do not store t3 in a register and the respective pieces of exclusive ORs of RR/RL are directly calculated)

[Cycle 3]

$$RR = FI((t1 \oplus KOi3), KIi3) \oplus RR$$

$$RL = RL \oplus KOi4 \quad \text{[Expression 12]}$$

Figure 4:
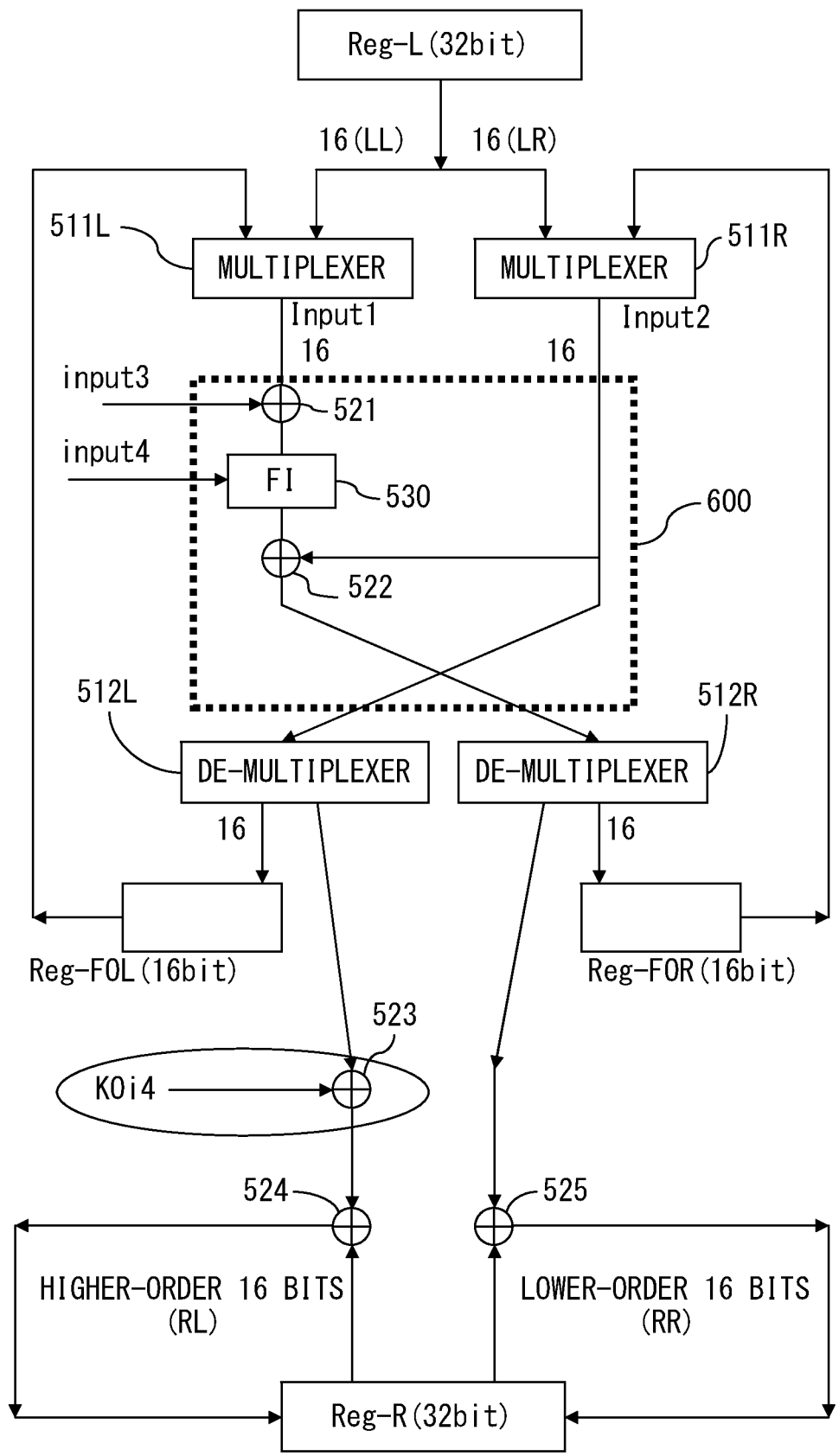
FIG. 4 is the conventional configuration of the unit illustrated in FIG. 3.
Figure 8A:
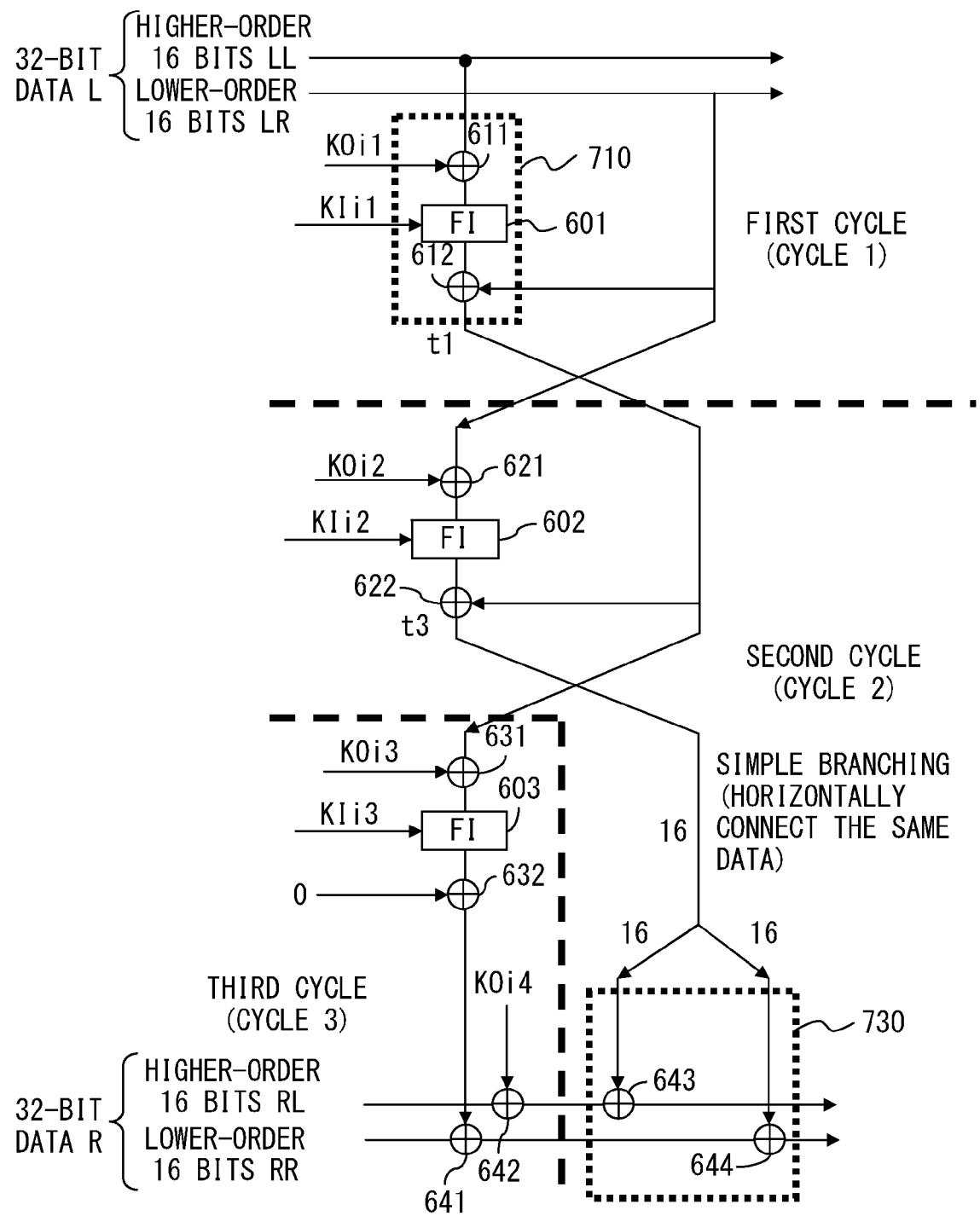
FIG. 8A is a view obtained by dividing FIG. 7B in relation to the cycles 1 through 3 of the process algorithm in the first preferred embodiment of the present invention.
Figure 8B:
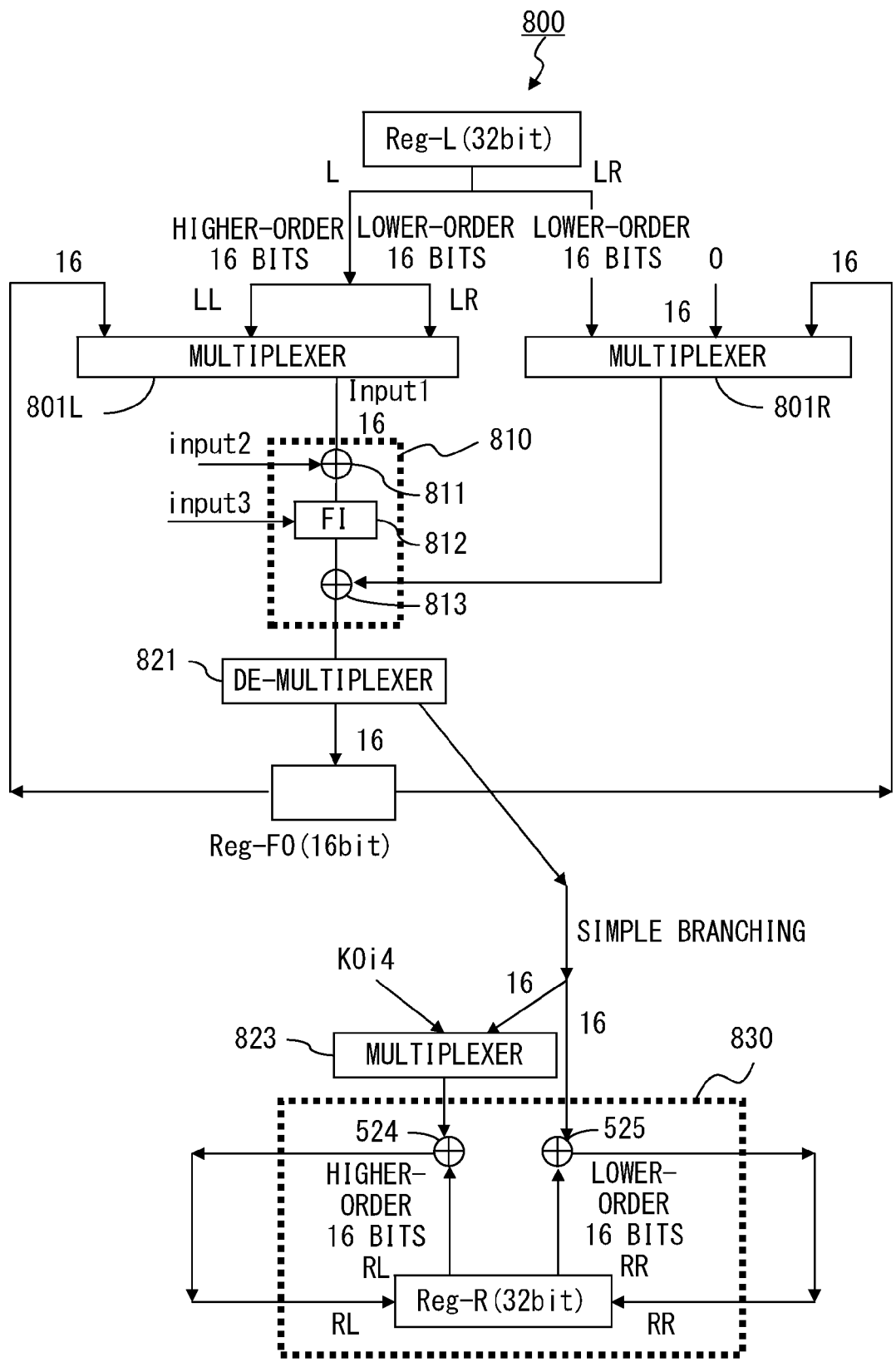
FIG. 8B is a configuration example of the FO function-related processing circuit in the second preferred embodiment of the present invention.

FIG. 8A is a view obtained by dividing FIG. 7B in relation to the cycles 1 through 3 of the process algorithm AL1. FIG. 8B is a configuration example of the FO function-related processing circuit realized by making the process algorithm hardware. In FIG. 8, the same reference numerals are attached to the same components as those of the circuit illustrated in FIG. 4.

As illustrated in FIG. 8A, the process algorithm illustrated in FIG. 7B can be divided into three cycles of cycles 1 (first cycle) through cycle 3 (third cycle). In these three cycles, the process of a process block 710 illustrated in the top of FIG. 8A is common to all the cycles 1 through 3. Therefore, this process block 710 is realized by hardware as a circuit component 810 as illustrated in FIG. 8B. The circuit component 810 includes an exclusive OR calculator 811, an FI function processing unit 812 and an exclusive OR calculator 813.

A process block 730 illustrated in FIG. 8A is a process dedicated to the cycle 2. Therefore, this process block 730 is realized by hardware as a circuit component 830 as illustrated in FIG. 8B. The circuit component 830 includes two exclusive OR calculators 524 and 525 and one register Reg-R. The register Reg-R is a 32-bit register. The circuit component 830 is included in the circuit illustrated in FIG. 4 and is not a new component. The circuit illustrated in FIG. 8B includes a 32-bit register Reg-L, two 3-input 1-output multiplexer 801R and 801L, a de-multiplexer 821, a multiplexer 823 and a 16-bit register Reg-FO.

The registers of the FO function-related processing circuit (encryption device) 800 in this preferred embodiment illustrated in FIG. 8B include two 32-bit registers Reg-L and Reg-R, one 16-bit register Reg-FO and the register size of the entire circuit is 80 bits. Therefore, its register size is smaller than that of the conventional FO function-related processing circuit 510 illustrated in FIG. 4 by 16 bits. This is because the two registers Reg-FOL and Reg-FOR of the conventional FO function-related processing circuit 510 is replaced with one register Reg-FO. In the FO function-related processing circuit 800 in this preferred embodiment, the exclusive OR calculator dedicated for the key KOi4, of the conventional FO function-related processing circuit 510 is also deleted.

The register Reg-L stores 32-bit input data. In this case, the higher-order 16-bit data of the 32-bit data L stored in the register Reg-L is expressed as LL, and lower-order 16-bit data of the 32-bit data L stored in the register Reg-L is expressed as LR. The 32-bit data L stored in the register Reg-L is divided into the higher-order 16-bit data LL and the lower-order 16-bit data, and are inputted to a multiplexer 801L. The lower-order 16-bit data LR of the 32-bit data L stored in the register Reg-L is inputted to a multiplexer 801R, too.

The 16-bit data stored in the register Reg-FO is also inputted to the multiplexer 801L. The multiplexer 801L selects one of three pieces of the above-described 16-bit data and outputs the selected 16-bit data to an exclusive OR calculator 811. In addition to the above 16-bit data LR, a 16-bit "0" data and the 16-bit data stored in the register Reg-FO are inputted to the multiplexer 801R. The multiplexer 801R selects one of three pieces of these 16-bit data and outputs the selected 16-bit data to an exclusive OR calculator 813.

The exclusive OR calculator 811 calculates the exclusive OR of 16-bit data inputted from the multiplexer 801L and an externally inputted key KOij (j=1-3) and outputs the calculation result (16-bit data) to an FI function processing unit 812. The FI function processing unit 812 converts the 16-bit data inputted from the exclusive OR calculator 811, using an externally inputted key KIij (j=1-3) and outputs the conversion result (16-bit data) to the exclusive OR calculator 813. The exclusive OR calculator 813 calculates the exclusive OR of 16-bit data inputted from the FI function processing unit 812 and 16-bit data inputted from the multiplexer 801R and outputs the calculation result to a de-multiplexer 821.

The de-multiplexer 821 outputs 16-bit data inputted from the exclusive OR calculator 813 to the register Reg-FO, a multiplexer 823 and an exclusive OR calculator 525. The de-multiplexer 821 can also be replaced with a switch for opening/closing input from the exclusive OR calculator 813. A key KOi4 is also externally inputted to the multiplexer 823. The multiplexer 823 selects one of the output of the de-multiplexer 821 and the key KOi4 and outputs the selected 16-bit data to an exclusive OR calculator 524. The exclusive OR calculator 524 calculates the exclusive OR of the output of the multiplexer 823 (16-bit data) and the higher-order 16-bit data of the 32-bit data R stored in the register Reg-R and outputs the logical calculation result (16-bit data) to the register Reg-R. The register Reg-R stores 16-bit data outputted from the exclusive OR calculator 524 as the higher-order 16 bits of the 32-bit data R. Thus, the register Reg-R has a function to store the latest logical calculation result (16-bit data) of the exclusive OR calculator 524 as the higher-order 16 bits of the 32-bit data R. In other words, the higher-order 16 bits of the 32-bit data R stored in the register Reg-R is updated by the logical calculation result of the exclusive OR calculator 524.

The exclusive OR calculator 525 calculates the exclusive OR of the output (16-bit data) of the de-multiplexer 821 and the lower-order 16-bit data stored in the register Reg-R and outputs the logical calculation result (16-bit data) to the register Reg-R. The register Reg-R stores 16-bit data outputted from the exclusive OR calculator 525 as the lower-order 16 bits of the 32-bit data. Thus, the register Reg-R has a function to store the latest logical calculation result (16-bit data) of the exclusive OR calculator 525 as the higher-order 16 bits of the 32-bit data. In other words, the lower-order 16 bits of the 32-bit data R stored in the register Reg-R is updated by the logical calculation result of the exclusive OR calculator 525. The update processes of the higher-order 16 bits RL and the lower-order 16 bits RR can be performed in parallel.

As to the respective components of the FO function-related processing circuit 800 illustrated in FIG. 8B, their operations and timing are controlled by control signals outputted from a control unit, which is not illustrated. The roles (functions) of the registers Reg-L and Reg-R are replaced for each FO function in each stage. More specifically, the circuit illustrated in FIG. 8B is the circuit configuration of the FO function in odd stages (first stage, third stage, fifth stage, . . . and so on). In the FO function in even stages (second stage, fourth stage, sixth stage, . . . and so on), the arrangement of the registers Reg-L and Reg-R are replaced. This is because as described above, in a Feistel structure, L (the higher-order 32 bits of the 64-bit data) and R (the lower-order 32 bits of the 64-bit data) are alternately replaced every time its stage changes. This also applies to the second and third preferred embodiments described later.

The process can be also performed after replacing the order of cycles 2 and 3 in the above process algorithm AL1. Specifically, the process can also be performed in order of cycles 1, 3 and 2. The process of calculating the exclusive OR of RL and an extended key KOi4 can also be performed with the timing of cycle 1 without any problem. Thus, the multiplexer 823 for selecting the extended key KOi4 can be removed from the above FO function-related processing circuit 800. In this case, the exclusive OR of RL and the extended key KOi4 can also be calculated outside the circuit 800.

Operation of First Embodiment of FO Function-Related Processing Circuit

The FO function-related processing circuit 800 illustrated in FIG. 8B performs the process of the above process algorithm AL1. The operation of the FO function-related processing circuit 800 will be explained for each cycle of the process algorithm AL1 below.

[Cycle 1]

The multiplexer 801L selectively outputs 16-bit data LL inputted from the register Reg-L to an exclusive OR calculator 811. The exclusive OR calculator 811 calculates the exclusive OR of the 16-bit data LL and an externally inputted key KOij and outputs the calculation result to the FI function processing unit 812. The FI function processing unit 812 converts the above calculation result, using an externally inputted key KIi1 and outputs the conversion result to the exclusive OR calculator 813. However, the multiplexer 801R selectively outputs the lower-order 16 bits LR of the 32-bit data L stored in the register Reg-L to the exclusive OR calculator 813. The exclusive OR calculator 813 calculates the exclusive OR of input data from the FI function processing unit 812 and input data (LR) from the multiplexer 801R and outputs the calculation result t1 to the de-multiplexer 821. The de-multiplexer 821 outputs the 1-bit data t1 to the register Reg-FO. The register Reg-FO stores the inputted 16-bit data t1.

[Cycle 2]

The Multiplexer 801L selectively outputs the lower-order 16 bits LR of the 32-bit data L stored in the register Reg-L to the exclusive OR calculator 811. The exclusive OR calculator 811 calculates the exclusive OR of the 16-bit data LR and an externally inputted key KOi2 and outputs the calculation result to the FI function processing unit 812. The FI function processing unit 812 converts the calculation result, using an externally inputted key KIi2 and outputs the conversion result to the exclusive OR calculator 813. The multiplexer 801R selectively outputs the 16-bit data t1 stored in the register Reg-FO to the exclusive OR calculator 813. The exclusive OR calculator 813 calculates the exclusive OR of the conversion result of the FI function processing unit 812 and the 16-bit data t1 and outputs the calculation result (16-bit data) t3 to the de-multiplexer 821. The de-multiplexer 821 outputs the 16-bit data t3 to the multiplexer 823 and the exclusive OR calculator 525. The exclusive OR calculator 525 calculates the exclusive OR of the lower-order 16 bits RR of the 32-bit data stored in the register Reg-R and the 16-bit data t3 and outputs the calculation result (16-bit data) to the register Reg-R. The register Reg-R stores the calculation result as the lower-order 16 bits RR of the 32-bit data.

The multiplexer 823 selectively outputs the above 16-bit data t3 to an exclusive OR calculator 524. The exclusive OR calculator 524 calculates the exclusive OR of the 16-bit data t3 and the higher-order 16 bits RL of the 32-bit data stored in the register Reg-R and outputs the calculation result (16-bit data) to the register Reg-R. The register Reg-R stores the calculation result as the higher-order 16 bits RL of the 32-bit data.

Thus, in cycle 2, the output t1 of the exclusive OR calculator 813 is not stored in the register Reg-FO. The exclusive OR of t3 and the 16-bit data RR and 16-bit data RL stored in the register Reg-R is directly calculated.

[Cycle 3]

The multiplexer 801L selectively outputs the 16-bit data t1 stored in the register Reg-FO to an exclusive OR calculator 811. The exclusive OR calculator 811 calculates the exclusive OR of the 16-bit data t1 and an externally inputted key KOi3 and outputs the calculation result to the FI function processing unit 812. The FI function processing unit 812 coverts the calculation result, using an externally inputted key KIi3 and outputs the conversion result to the exclusive OR calculator 813. The multiplexer 801R outputs 16-bit "0" data (data whose 16 bits all are "0") to the exclusive OR calculator 813. The exclusive OR calculator 813 calculates the exclusive OR of input from the FI function processing unit 812 and the above 16-bit "0" data and outputs the calculation result to the de-multiplexer 821. Therefore, in this case, the output data (16-bit data) of the FI function processing unit 812 is inputted to the de-multiplexer 821 without applying any process. The de-multiplexer 821 outputs the output data of the FI function processing unit 812 to the exclusive OR calculator 525. The exclusive OR calculator 525 calculates the exclusive OR of the output data of the FI function processing unit 812 and the lower-order 16 bits RR of the 32-bit data stored in the register Reg-R, and outputs the calculation result to the register Reg-R. The register Reg-R stores the 16-bit data inputted from the exclusive OR calculator 525 as the lower-order 16 bits RR of the 32-bit data R. The multiplexer 823 selectively outputs an externally inputted key KOi4 to the exclusive OR calculator 524. The exclusive OR calculator 524 calculates the exclusive OR of the key KOi4 and the higher-order 16 bits RL of the 32-bit data stored in the register Reg-R, and outputs the calculation result to the register Reg-R. The register Reg-R stores the above calculation result as the higher-order 16 bits RL of the 32-bit data.

Second Embodiment

Method

The process algorithm of the FO function-related processing circuit in the second preferred embodiment of the present invention is obtained by further equivalently converting the above-described process algorithm of the FO function-related processing circuit illustrated in FIG. 8B.

Figure 5:
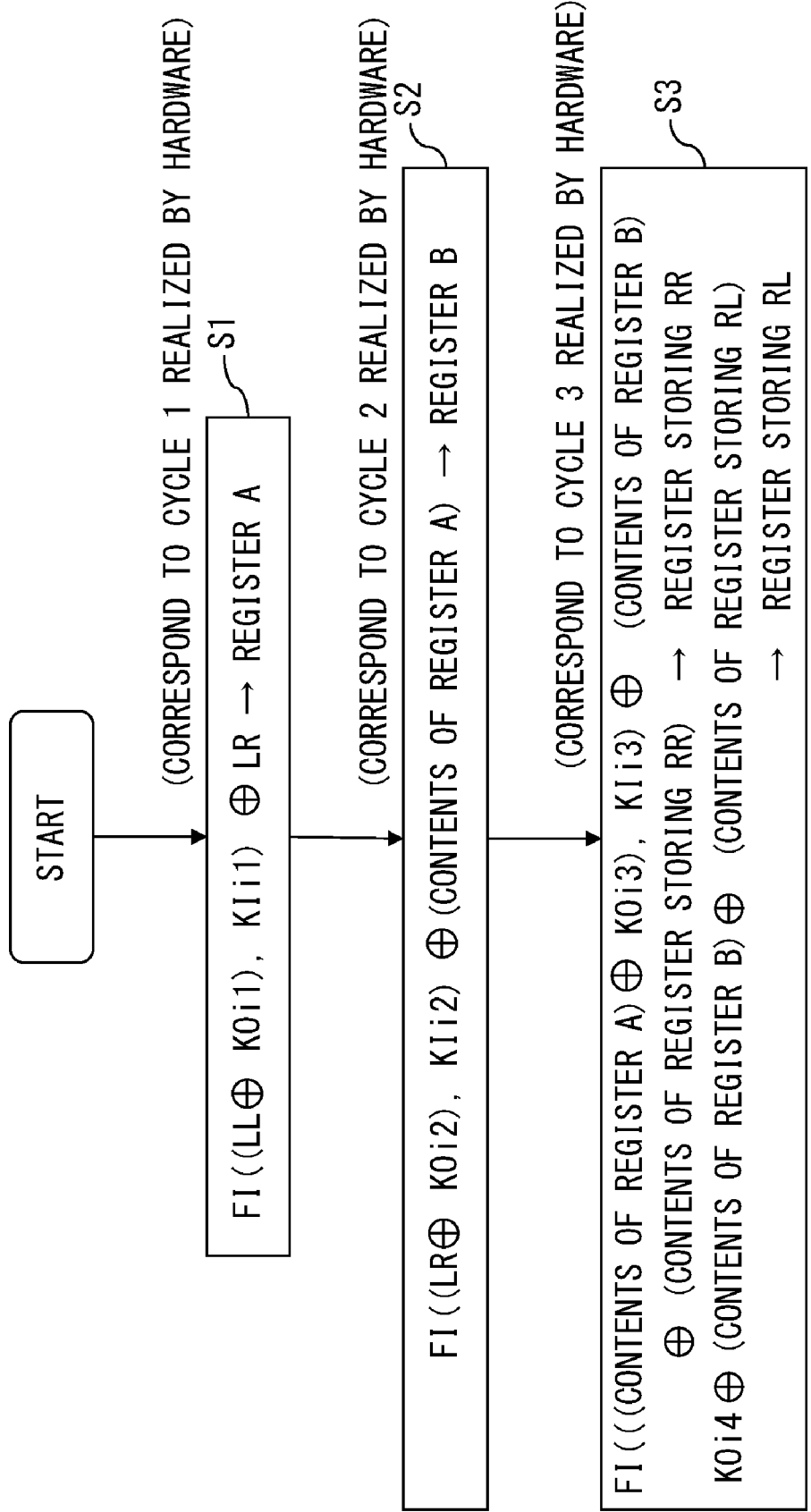
FIG. 5 is a flowchart illustrating the conventional software process of an FO function-related process algorithm.

This equivalent conversion will be explained with reference to FIGS. 9A and 9B. The process algorithm of the FO function-related processing circuit illustrated in FIG. 9A is the same as the conventional process algorithm illustrated in FIG. 5A.

Figure 9B:
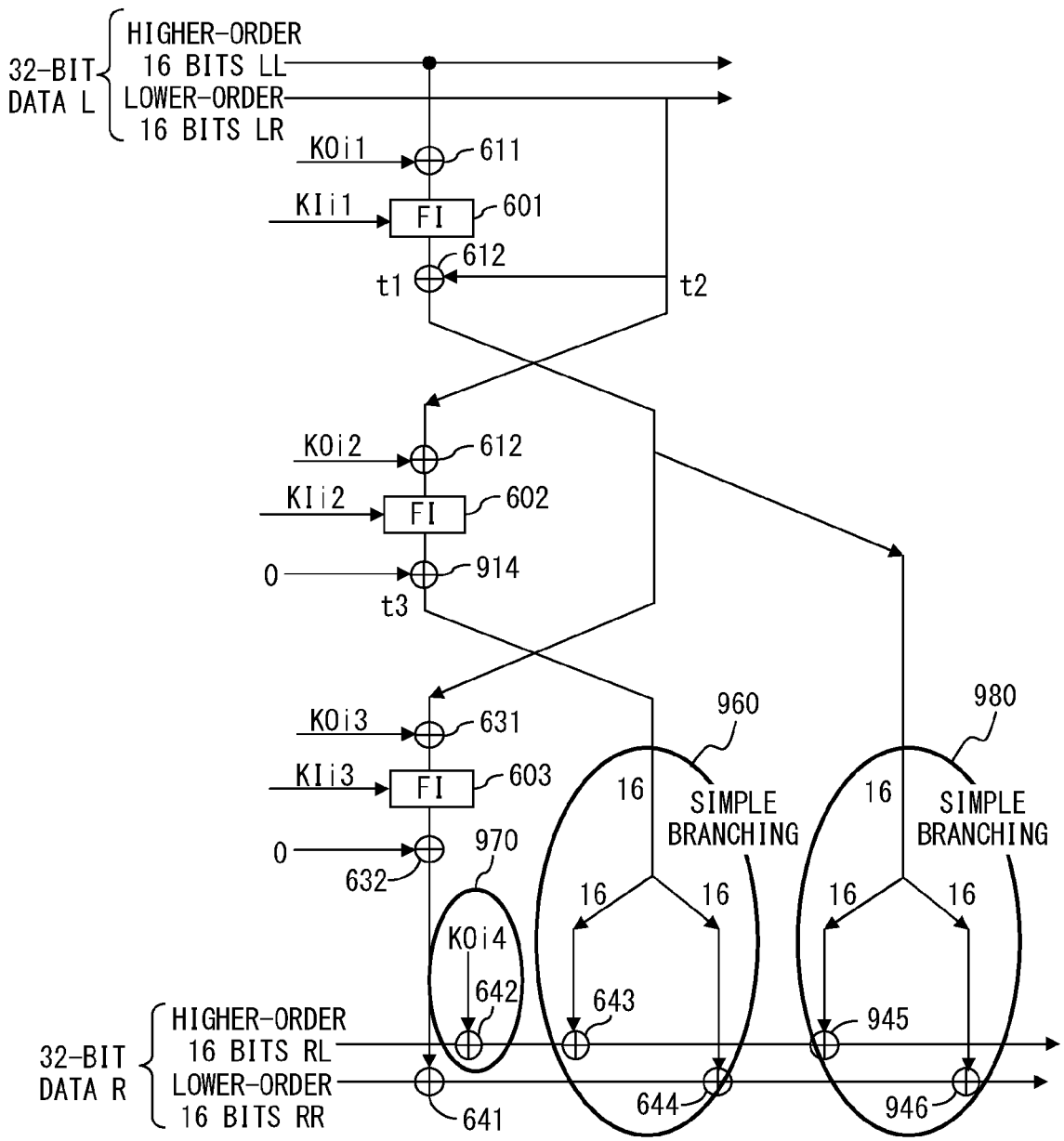
FIG. 9B illustrates the process algorithm in the second preferred embodiment of the present invention, obtained by equivalently converting the process algorithm illustrated in FIG. 9A.

The above-described process algorithm of the FO function-related processing circuit in the first preferred embodiment was obtained by equivalently converting the parts enclosed elliptical frames 660 and 670 illustrated in FIG. 9A. The process algorithm of the FO function-related processing circuit in the second preferred embodiment is obtained by equivalently converting the part enclosed elliptical frames 680 and 670 illustrated in FIG. 9A in addition to the above two parts and transforming the process algorithm having the configuration illustrated in FIG. 9A into a process algorithm having the configuration illustrated in FIG. 9B.

In FIG. 9B, a part enclosed with elliptical frames 960 and 970 has the same configuration as the process algorithm of the FO function-related processing circuit in the first preferred embodiment. In the second preferred embodiment, as enclosed with an elliptical frame 980 and illustrated in FIG. 9B, an exclusive OR 945 is added to a route for processing the higher-order 16 bits RL of the 32-bit data R (hereinafter called a "higher-order 16-bit RL lower-order processing route"). This exclusive OR 945 is arranged in a stage after an exclusive OR 643 in the higher-order 16-bit RL lower-order processing route. Furthermore, an exclusive OR 946 is added to a route for processing the lower-order 16 bits RR of the 32-bit data R (hereinafter called a "lower-order 16-bit RR processing route"). This exclusive OR 946 is arranged in a stage after an exclusive OR 644 in the lower-order 16-bit RR processing route. The output of the exclusive OR 644 and output of the exclusive OR 612 are inputted to the exclusive OR 946. The output of the exclusive OR 643 and output of the exclusive OR 612 are inputted to the exclusive OR 945. 16-bit "0" data is inputted to an exclusive OR 914 to which the output of the FI function 602 of a MISTY structure in the second stage. The logical calculation result of this exclusive OR 914 is inputted to the exclusive ORs 643 and 644.

Process Algorithm AL2 in Second Embodiment of FO Function-Related Processing Circuit The process algorithm AL2 illustrated in FIG. 9B includes the following cycles 1 through 3.
[Cycle 1]

$$t1 = FI((LL \oplus KOi1), KIi1) \oplus LR$$

$$RR = t1 \oplus RR$$

$$RL = t1 \oplus RL \qquad \text{[Expression 13]}$$

(t1 is stored in a register)
[Cycle 2]

$$t3 = FI((LR \oplus KOi2), KIi2)$$

$$RR = t3 \oplus RR$$

$$RL = t3 \oplus RL \qquad \text{[Expression 14]}$$

(t3 is not stored in a register and the respective pieces of exclusive OR of t3 and RR/RL are directly calculated)
[Cycle 3]

$$RR = FI((t1 \oplus KOi3), KIi3) \oplus RR$$

$$RL = RL \oplus KOi4 \qquad \text{[Expression 15]}$$

Hardware Configuration in Second Embodiment of FO Function-Related Processing Circuit FIG. 10A is a view obtained by dividing FIG. 9B in relation to cycles 1 through 3 of the above process algorithm AL2. FIG. 10B is a configuration example of the FO function-related processing circuit in which the process algorithm illustrated in FIG. 10A is realized by hardware. In FIG. 10B, the same reference numerals are attached to the same components as those of the FO function-related processing circuit 800 illustrated in FIG. 8B.

As illustrated in FIG. 10A, the process algorithm illustrated in FIG. 9B can be divided into three cycles of cycles 1 (first cycle) through cycle 3 (third cycle). In these three cycles, the process of a process block 710 at the top in the FIG. 10A is common to all the cycles 1 through 3. Therefore, as illustrated in FIG. 10B, this process block 710 is realized by hardware as a circuit component 810 in the same way as in the above-described first preferred embodiment. This circuit component 810 includes an exclusive OR calculator 811, an FI function processing unit 812 and an exclusive OR calculator 813.

As to the above-described process algorithm AL2, if the order of cycles 2 and 3 is replaced, there is no problem in its process result. The FO function-related processing circuit illustrated in FIG. 10 which is described below executes the above process algorithm AL2 in order of cycles 1, 3 and 2.

The configuration of an FO function-related processing circuit 1000 illustrated in FIG. 10B will be explained. Its components different from those of the FO function-related processing circuit 800 will be described below and as to its same components as the FO function-related processing circuit 800, their explanations will be omitted.

The FO function-related processing circuit 1000 illustrated in FIG. 10B includes a multiplexer 1001R instead of the multiplexer 801R of the FO function-related processing circuit 800. The FO function-related processing circuit 1000 includes no de-multiplexer 821 of the FO function-related processing circuit 800.

Although the multiplexer 801R is a 3-input 1-output multiplexer, the multiplexer 1001R is 2-input 1-output multiplexer. Therefore, the circuit size of the FO function-related processing circuit 1000 can be made smaller than that of the FO function-related processing circuit 800. The multiplexer 1001R inputs the lower-order 16 bits LR of the 32-bit data L stored in the register Reg-L and 16-bit "0" data, and selectively outputs it to the exclusive OR calculator 813. The output of the exclusive OR calculator 813 is inputted to the register Reg-FO, the multiplexer 823 and the exclusive OR calculator 525.

Operation in Second Embodiment of FO Function-Related Processing Circuit

The FO function-related processing circuit 1000 illustrated in FIG. 10B executes the above process algorithm AL2 in order of cycles 1, 3 and 2. The operation of the FO function-related processing circuit 1000 will be explained for each cycle of the process algorithm AL2 below.
[Cycle 1a (Cycle 1 of Process Algorithm Al2)]

The multiplexer 801L selectively outputs 16-bit data LL inputted from the register Reg-L to the exclusive OR calculator 811. The exclusive OR calculator 811 calculates the exclusive OR of the 16-bit data LL and an externally inputted key KOi1 and outputs the calculation result to the FI function processing unit 812. The FI function processing unit 812 converts the above calculation result, using an externally inputted key KIi1 and outputs the conversion result to the exclusive OR calculator 813. However, the multiplexer 1001R selectively outputs the lower-order 16 bits LR of the 32-bit data stored in the register Reg-L to the exclusive OR calculator 813. The exclusive OR calculator 813 calculates the exclusive OR of input data from the FI function processing unit 812 and input data from the multiplexer 1001R and outputs the calculation result t1 to the register Reg-FO, the multiplexer 823 and the exclusive OR calculator 525. The register Reg-FO stores the inputted 16-bit data t1.

The exclusive OR calculator 525 calculates the exclusive OR of the above 16-bit data t1 and the lower-order 16 bits RR of the 32-bit data R stored in the register Reg-R and outputs the calculation result to the register Reg-R. The register Reg-R stores the calculation result as the lower-order 16 bits RR of the 32-bit data.

The multiplexer 823 selectively outputs the 16-bit data t1 to the exclusive OR calculator 524. The exclusive OR calculator 524 calculates the exclusive OR of the 16-bit data t1 and the higher-order 16 bits RL of the 32-bit data R stored in the register Reg-R and outputs the calculation result to the register Reg-R. The register Reg-R stores the calculation result as the higher-order 16 bits RL of 32-bit data R.

[Cycle 2a (Cycle 3 of Process Algorithm AL2)]

The multiplexer 801L selectively outputs the 16-bit data stored in the register Reg-FO to the exclusive OR calculator 811. The exclusive OR calculator 811 calculates the exclusive OR of the 16-bit data t1 and an externally inputted key KOi3 and outputs the calculation result to the FI function processing unit 812. The FI function processing unit 812 converts the calculation result, using an externally inputted key KIi3 and outputs the conversion result to the exclusive OR calculator 813. The multiplexer 1001R outputs 16-bit "0" data (data whose 16 bits all are "0") to the exclusive OR calculator 813. The exclusive OR calculator 813 calculates the exclusive OR of input from the FI function processing unit 812 and the above 16-bit "0" data and outputs the calculation result (16-bit data) to the register Reg-FO, the multiplexer 823 and the exclusive OR calculator 525. Therefore, as in the case of cycle 2, the process result of the FI function processing unit 812 is inputted to the register Reg-FO, the multiplexer 823 and the exclusive OR calculator 525 without applying any process to it. The exclusive OR calculator 525 calculates the exclusive OR of the process result of the FI function processing unit 812 and the lower-order 16 bits RR of the 32-bit data R stored in the register Reg-R and outputs the calculation result to the register Reg-R. The register Reg-R stores the calculation result as the lower-order 16 bits RR of the 32-bit data R.

The multiplexer 823 selectively outputs a key KOi4 to the exclusive OR calculator 524. The exclusive OR calculator 524 calculates the exclusive OR of the key KOi4 and the higher-order 16 bits RL of the 32-bit data R stored in the register Reg-R and outputs the calculation result to the register Reg-R. The register Reg-R stores the calculation result as the higher-order 16 bits RL of the 32-bit data R.

[Cycle 3a (Cycle 2 of Process Algorithm AL2)]

The multiplexer 801L selectively outputs the lower-order 16 bits LR of the 32-bit data stored in the register Reg-L to the exclusive OR calculator 811. The exclusive OR calculator 811 calculates the exclusive OR of the 16-bit data LR and an externally inputted key KOi2 and outputs the logical calculation result to the FI function processing unit 812. The FI function processing unit 812 converts the logical calculation result, using the externally inputted key KIi2 and outputs the conversion result (16-bit data t3) to the exclusive OR calculator 813.

The multiplexer 1001R outputs 16-bit "0" data to the exclusive OR calculator 813. The exclusive OR calculator 813 calculates the exclusive OR of the above 16-bit data t3 inputted from the FI function processing unit 812 and the above 16-bit "0" data and outputs the calculation result to the register Reg-FO, the multiplexer 823 and the exclusive OR calculator 524. Therefore, in this case, the output of the FI function processing unit 812 (16-bit data t3) are inputted to the register Reg-FO, the multiplexer 823 and the exclusive OR calculator 525.

The exclusive OR calculator 525 calculates the exclusive OR of the above 16-bit data t3 and the lower-order 16 bits RR of the 32-bit data R stored in the register Reg-R and outputs the calculation result to the register Reg-R. The register Reg-R stores the calculation result as the lower-order 16 bits RR of the 32-bit data R.

The multiplexer 1001R outputs the lower-order 16 bits LR of the 32-bit data L stored in the register Reg-L to the exclusive OR calculator 813. The exclusive OR calculator 813 calculates the exclusive OR of the above 16-bit data t3 inputted from the FI function processing unit 812 and the above 16-bit data LR inputted from the multiplexer 1001R and outputs the calculation result to the register Reg-FO, the multiplexer 823 and the exclusive OR calculator 525. The multiplexer 823 selectively outputs the above 16-bit data t3 to the exclusive OR calculator 524. The exclusive OR calculator 524 calculates the exclusive OR of the 16-bit data t3 and the higher-order 16 bits RL of the 32-bit data R stored in the register Reg-R and outputs the calculation result (16-bit data) to the register Reg-R. The register Reg-R stores the calculation result as the higher-order 16 bits RL of the 32-bit data R.

Thus, in cycle 2, the output t3 of the exclusive OR calculator 813 is not stored in the register Reg-FO. The exclusive ORs of t3 and the 16-bit data RR/RL stored in the register Reg-R are directly calculated.

The above process algorithm AL2 can execute a cycle 2—equivalent process before cycle 1. The process algorithm in this case will be described below.

{Variation of Process Algorithm AL2 (Process Algorithm AL2v)}

[Cycle 1]

$$t3 = FI((LR \oplus KOi2), KIi2)$$

$$RR = t3 \oplus RR$$

$$RL = t3 \oplus RL \qquad \text{[Expression 16]}$$

(t3 is not stored in a register and the respective pieces of exclusive OR of t3 and RR/RL are directly calculated)

$$t1 = FI((LL \oplus KOi1), KIi1) \oplus LR$$

$$RR = t1 \oplus RR$$

$$RL = t1 \oplus RL \qquad \text{[Expression 17]}$$

(t1 is stored in a register)
[Cycle 3]

$$RR = FI((t1 \oplus KOi3), KIi3) \oplus RR$$

$$RL = RL \oplus KOi4 \qquad \text{[Expression 18]}$$

Since the process algorithms AL2 and AL2v differ only in the execution order of cycles 1 and 2, the FO function-related processing circuit 1000 illustrated in FIG. 10B can be used as a device for executing the above process algorithms AL2v. Since in this case, the execution control of the FO function-related processing circuit 1000 has to follow the process algorithms AL2v, it is necessary to modify a control unit for controlling the execution of the FO function-related processing circuit 1000. This modification of the control unit can be made the modification of either hardware or software.

The configuration of the above FO function-related processing circuit 1000 can also be modified in such away that the process algorithms AL2 may be executed in the order of cycles 1, 2 and 3. In this case, in cycle 2, it is necessary to prevent the calculation result of the exclusive OR calculator 813 from being stored in the register Reg-FO. For example, a switch for turning the input of the register Reg-FO off only during the process period of cycle 2 has to be provided. Alternatively, a multiplexer can also be arranged at a simple branching point between the exclusive OR calculator 813 and the register Reg-FO. This multiplexer outputs the bit data in both of the right and left directions in cycle 1 and only in the right direction in cycle 2. In cycle 3, it outputs the bit data in both the right and left direction or in only right direction.

Third Embodiment

Method

The process algorithm of the FO function-related processing circuit in the third preferred embodiment of the present invention is obtained by further equivalently converting the above-described process algorithm of the FO function-related processing circuit illustrated in FIG. 10A.

Figure 11B:
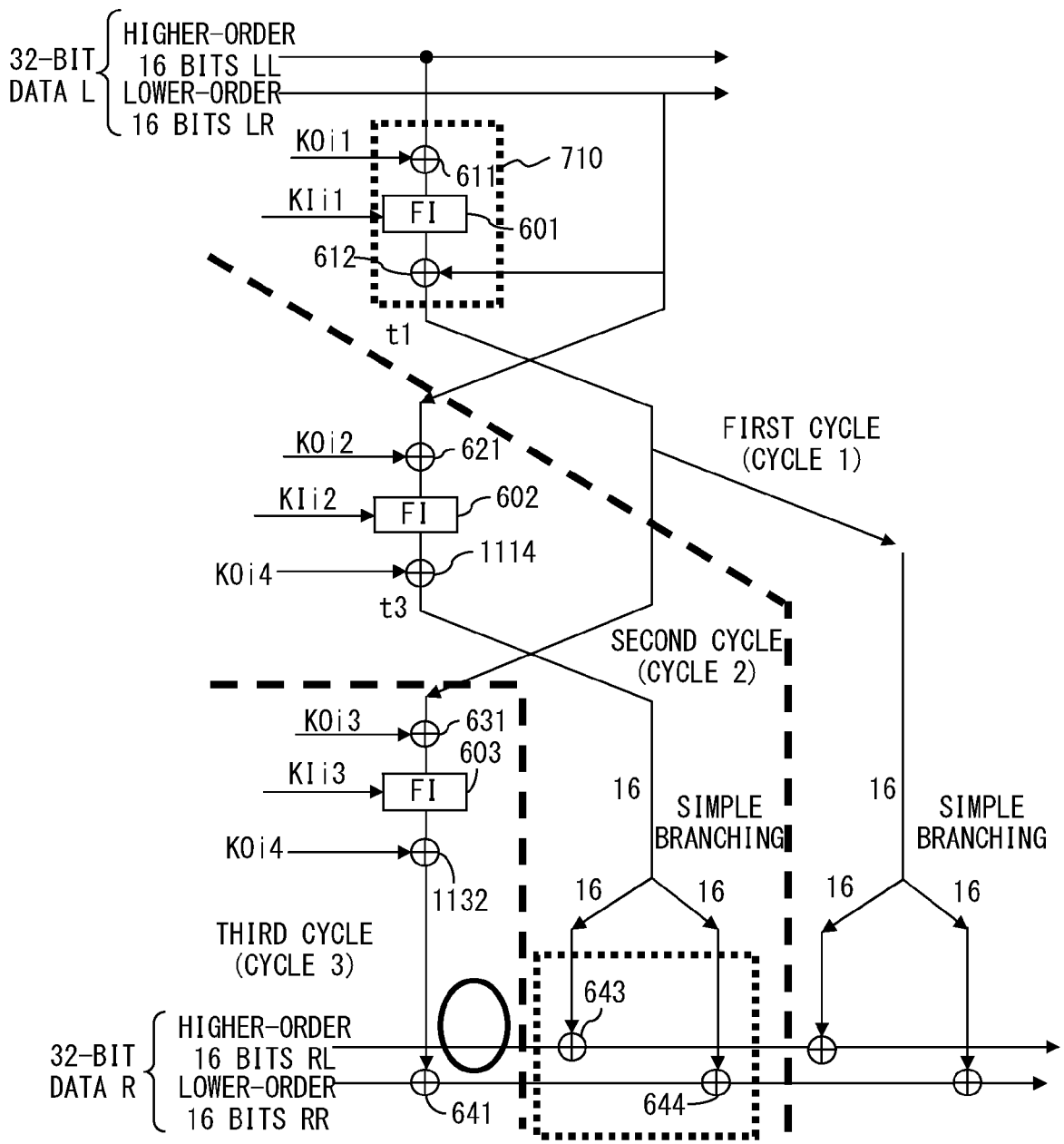
FIG. 11B illustrates the process algorithm of the FO function-related processing circuit in the third preferred embodiment of the present invention.

This equivalent conversion will be explained with reference to FIGS. 11A and 11B. FIG. 11A illustrates the same process algorithm as that of the FO function-related processing circuit illustrated in FIG. 10A.

The FO function-related processing circuit in the third preferred embodiment illustrated in FIG. 11B is obtained by replacing the exclusive ORs 914 and 632 to which 16-bit "0" data is inputted with exclusive ORs 1114 and 1132 to which a key KOi4 is inputted in the process algorithm illustrated in FIG. 11A. Then, accompanying this modification, the exclusive OR 642 to which a key KOi4 is inputted is deleted. Thus, one exclusive OR calculation can be deleted.

Process Algorithm AL3 in Third Embodiment of FO Function-Related Processing Circuit The process algorithm AL3 illustrated in FIG. 11B includes the following cycles 1 through 3.

[Cycle 1]

$$t1 = FI((LL \oplus KOi1), KIi1) \oplus LR$$

$$RR = t1 \oplus RR$$

$$RL = t1 \oplus RL \quad \text{[Expression 19]}$$

(t1 is stored in a register)
[Cycle 2]

$$t3 = FI((LR \oplus KOi2), KIi2) \oplus KOi4$$

$$RR = t3 \oplus RR$$

$$RL = t3 \oplus RL \quad \text{[Expression 20]}$$

(t3 is not stored in a register and the respective pieces of exclusive OR of t3 and RR/RL are directly calculated)
[Cycle 3]

$$RR = FI((t1 \oplus KOi3), KIi3) \oplus KOi4 \oplus RR$$

$$RL = RL \quad \text{[Expression 21]}$$

Hardware Configuration in Third Embodiment of FO Function-Related Processing Circuit FIG. 12 is a configuration example of the FO function-related processing circuit in which the process algorithm illustrated in FIG. 11B is realized by hardware. In FIG. 12, the same reference numerals are attached to the same components as those of the circuit illustrated in FIG. 10B.

The configuration of an FO function-related processing circuit 1200 illustrated in FIG. 12 will be explained. The explanations of the same components as the above-described FO function-related processing circuit 1000 will be omitted and only its components different from the FO function-related processing circuit 1000 will be explained. As to the above process algorithm AL3, even if the order of cycles 2 and 3 is replaced, its final process result does not change. The FO function-related processing circuit 1200 executes the above process algorithm AL3 in the order of cycles 1, 3 and 2.

The FO function-related processing circuit 1200 includes a multiplexer 1201R instead of the multiplexer 1001R of the FO function-related processing circuit 1000. The multiplexer 1201R inputs the lower-order 16 bits LR of the 32-bit data L stored in the register Reg-L and an externally inputted 16-bit key KOi4 and selectively outputs one of them to the exclusive OR calculator 813. The FO function-related processing circuit 1200 includes a multiplexer 1223 instead of the multiplexer 823 of the FO function-related processing circuit 1000. The multiplexer 1223 inputs the output of the exclusive OR calculator 813 (16-bit logical calculation result) and 16-bit "0" data and selectively outputs one of them to the exclusive OR calculator 524.

Operation in Third Embodiment of FO Function-Related Processing Circuit

The FO function-related processing circuit 1200 illustrated in FIG. 12 executes the above process algorithm AL3 in the order of cycles 1, 3 and 2. The operation of the FO function-related processing circuit 1200 will be explained for each cycle of the process algorithm AL3.

[Cycle 1b (Cycle 1 of Process Algorithm AL3)]

The multiplexer 801L selectively outputs 16-bit data LL inputted from the register Reg-L to the exclusive OR calculator 811. The exclusive OR calculator 811 calculates the exclusive OR of the 16-bit data LL and an externally inputted key KOi1 and outputs the calculation result to the FI function processing unit 812. The FI function processing unit 812 converts the calculation result, using an externally inputted key KIi1 and outputs the conversion result to the exclusive OR calculator 813. However, the multiplexer 1201R selectively outputs the lower-order 16 bits LR of the 32-bit data L stored in the register Reg-L to the exclusive OR calculator 813. The exclusive OR calculator 813 calculates the exclusive OR of input data from the FI function processing unit 812 and input data (LR) from the multiplexer 1201R and outputs the calculation result t1 to the register Reg-FO, the multiplexer 1223 and the exclusive OR calculator 525. The register Reg-FO stores the inputted 16-bit data t1.

The exclusive OR calculator 525 calculates the exclusive OR of the above 16-bit data t1 and the lower-order 16 bits RR of the 32-bit data R stored in the register Reg-R and outputs the calculation result to the register Reg-R. The register Reg-R stores the calculation result as the lower-order 16 bits RR of the 32-bit data R.

The multiplexer 1223 selectively outputs the above 16-bit data t1 to the exclusive OR calculator 524. The exclusive OR calculator 524 calculates the exclusive OR of the 16-bit data t1 and the higher-order 16 bits RL of the 32-bit data R stored in the register Reg-R and outputs the calculation result to the register Reg-R. The register Reg-R stores the calculation result as the higher-order 16 bits RL of the 32-bit data R.

[Cycle 2b (Cycle 3 of Process Algorithm AL3)]

The multiplexer 801L selectively outputs 16-bit data t1 stored in the Reg-FO to the exclusive OR calculator 811. The exclusive OR calculator 811 calculates the exclusive OR of the 16-bit data t1 and an externally inputted key KOi3 and outputs the calculation result to the FI function processing unit 812. The FI function processing unit 812 converts the logical calculation result, using an externally inputted key KIi3 and outputs the conversion result to the exclusive OR calculator 813. The multiplexer 1201R outputs a 16-bit key KOi4 to the exclusive OR calculator 813. The exclusive OR calculator 813 calculates the exclusive OR of input from the FI function processing unit 812 and the key KOi4 and outputs the calculation result (16-bit data) to the register Reg-FO, the multiplexer 1223 and the exclusive OR calculator 525. The exclusive OR calculator 525 calculates the exclusive OR of input (the above logical calculation result) from the exclusive OR calculator 813 and the lower-order 16 bits RR of the 32-bit data R stored in the register Reg-R and outputs the calculation result to the register Reg-R. The register Reg-R stores the calculation result as the lower-order 16 bits RR of the 32-bit data R.

The multiplexer 1223 selectively outputs 16-bit "0" data to the exclusive OR calculator 524. The exclusive OR calculator 524 calculates the exclusive OR of the higher-order 16 bits RL in the register Reg-R and the 16-bit "0" data and outputs the calculation result to the register Reg-R. The register Reg-R stores the calculation result as the higher-order 16 bits RL of the 32-bit data R.

[Cycle 3b (Cycle 2 of Process Algorithm AL3)]

The multiplexer 801L selectively outputs the lower-order 16 bits LR of the 32-bit data L stored in the register Reg-L to the exclusive OR calculator 811. The exclusive OR calculator 811 calculates the exclusive OR of the 16-bit data LR and an externally inputted key KOi2 and outputs the calculation result to the FI function processing unit 812. The FI function processing unit 812 converts the calculation result, using an externally inputted key KIi2 and outputs the conversion result (16-bit data t3) to the exclusive OR calculator 813.

The multiplexer 1201R outputs a 16-bit key KOi4 to the exclusive OR calculator 813. The exclusive OR calculator 813 calculates the exclusive OR of the 16-bit data t3 inputted from the FI function processing unit 812 and the 16-bit key KOi4 and outputs the calculation result to the register Reg-FO, the multiplexer 1223 and the exclusive OR calculator 525. Therefore, in this case, the output (16-bit data t3) of the FI function processing unit 812 is inputted to the register Reg-FO, the multiplexer 1223 and the exclusive OR calculator 525.

The exclusive OR calculator 525 calculates the exclusive OR of the above 16-bit data t3 and the lower-order 16 bits RR of the 32-bit data R stored in the register Reg-R and outputs the calculation result to the register Reg-R. The register Reg-R stores the calculation result as the lower-order 16 bits RR of the 32-bit data R.

The multiplexer 1201R outputs the lower-order 16 bits LR of the 32-bit data L stored in the register Reg-L to the exclusive OR calculator 813. The exclusive OR calculator 813 calculates the exclusive OR of the 16-bit data t3 inputted from the FI function processing unit 812 and the 16-bit data LR inputted from the multiplexer 1201R and outputs the calculation result to the register Reg-FO, the multiplexer 1223 and the exclusive OR calculator 525. The multiplexer 1223 selectively outputs the 16-bit data t3 to the exclusive OR calculator 524. The exclusive OR calculator 524 calculates the exclusive OR of the 16-bit data t3 and the higher-order 16 bits RL of the 32-bit data R stored in the register Reg-R and outputs the calculation result (16-bit data) to the register Reg-R. The register Reg-R stores the calculation result as the higher-order 16 bits RL of the 32-bit data R.

The respective pieces of exclusive OR of t3 and the 16-bit data RR/16-bit data RL stored in the register Reg-R are directly calculated.

As described above, in cycle 2b, as to the 32-bit data R stored in the register Reg-R, only its lower-order 16 bits RR is updated and its higher-order 16 bits RL is not updated. Therefore, in cycle 2b, the update of the register Reg-R is limited to only the lower-order 16 bits RR. In this case, there is no need for the multiplexer 1223 to selectively output the higher-order 16 bits RL "0" to the exclusive OR calculator 524. Therefore, in the FO function-related processing circuit 1200, the multiplexer 1223 can also be replaced with a switch.

The cycle 1 of the process algorithm AL3 is the same as the cycle 1 of the process algorithm AL2. In the process algorithm AL3, the execution order of cycles 1 and 2 can be exchanged. The process algorithm in this case will be described below.

{Variation of Process Algorithm AL3 (Process Algorithm AL3v)}

[Cycle 1]

$$t3 = FI((LR \oplus KOi2), KIi2) \oplus KOi4$$

$$RR = t3 \oplus RR$$

$$RL = t3 \oplus RL \quad \text{[Expression 22]}$$

(t3 is not stored in a register and the respective pieces of exclusive OR of t3 and RR/RL are directly calculated)

[Cycle 2]

$$t1 = FI(LL \oplus KOi1), KIi1) \oplus LR$$

$$RR = t1 \oplus RR$$

$$RL = t1 \oplus RL \quad \text{[Expression 23]}$$

(t1 is stored in a register)

[Cycle 3]

$$RR = FI((t1 \oplus KOi3), KIi3) \oplus RR \oplus KOi4$$

$$RL = RL \quad \text{[Expression 24]}$$

Since the process algorithm AL3v differs from the process algorithm AL3 only in the execution order of cycles 1 and 2, the FO function-related processing circuit 1200 illustrated in FIG. 12 can be used as a device for executing the above process algorithm AL3v. However, in this case, since it is necessary that the execution control of the FO function-related processing circuit 1200 follows the process algorithm AL3v, a control unit for controlling the execution of the FO function-related processing circuit 1200 has to be modified. This control unit can be modified by both hardware and software.

The configuration of the above the FO function-related processing circuit 1200 can also be modified in such a way as to execute the process algorithm AL3v in the order of cycles 1, 2 and 3. In this case, in cycle 2, it is necessary that the calculation result of the exclusive OR calculator 813 may not be stored in the register Reg-FO. For example, it is necessary to provide a switch for turning the input of the exclusive OR calculator off only during the process period of cycle 2. Alternatively, a multiplexer can also be arranged at a simple branching point between the exclusive OR calculator 813 and the register Reg-FO. This multiplexer outputs data in both the left and right directions in cycle 1 and only in the right direction in cycle 2. In cycle 3, it outputs data in either of both the left/right directions or only in the right direction.

The above-described reduction effects of the circuit scale by the respective FO function-related processing circuits (800, 1000 and 1200) in the first through third preferred embodiments of the present invention are illustrated in the following Table 1. In Table 1, the de-multiplexer is also include in multiplexers for convenience' sake. In this case, the de-multiplexer included in a "2-in 1 multiplexer". The registers do not include the registers Reg-L and Reg-R. The "2-in 1 multiplexer" means a 2-input 1-output multiplexer and "3-in 1 multiplexer" means a 3-input 1-output multiplexer.

TABLE 1

|  | Prior art | First Embodiment | Second Embodiment | Third Embodiment |
| --- | --- | --- | --- | --- |
| Register size | 16 bit × 2 | 16 bit × 1 | 16 bit × 1 | 16 bit × 1 |
| Size of exclusive OR calculator | 16 bit × 5 | 16 bit × 4 | 16 bit × 4 | 16 bit × 4 |
| Number of 2-in 1 multiplexer | 16 bit wide × 4 | 16 bit wide × 1 | 16 bit wide × 2 | 16 bit wide × 2 |
| Number of 3-in 1 multiplexer | 0 | 16 bit wide × 2 | 16 bit wide × 1 | 16 bit wide × 1 |

As illustrated in Table 1, according to the respective preferred embodiments of the present invention, the register size can be halved. Furthermore, the multiplexer size can be also reduced.

Fourth Embodiment

The functions of the above-described first through third preferred embodiments can be also executed by a program executed by a computer. Those preferred embodiments will be explained below. The following preferred embodiments are obtained by applying the present invention to embedded devices, such as a cellular phone, network-compatible electrical appliances or the like.

{First Configuration of Embedded Device}

Figure 13:
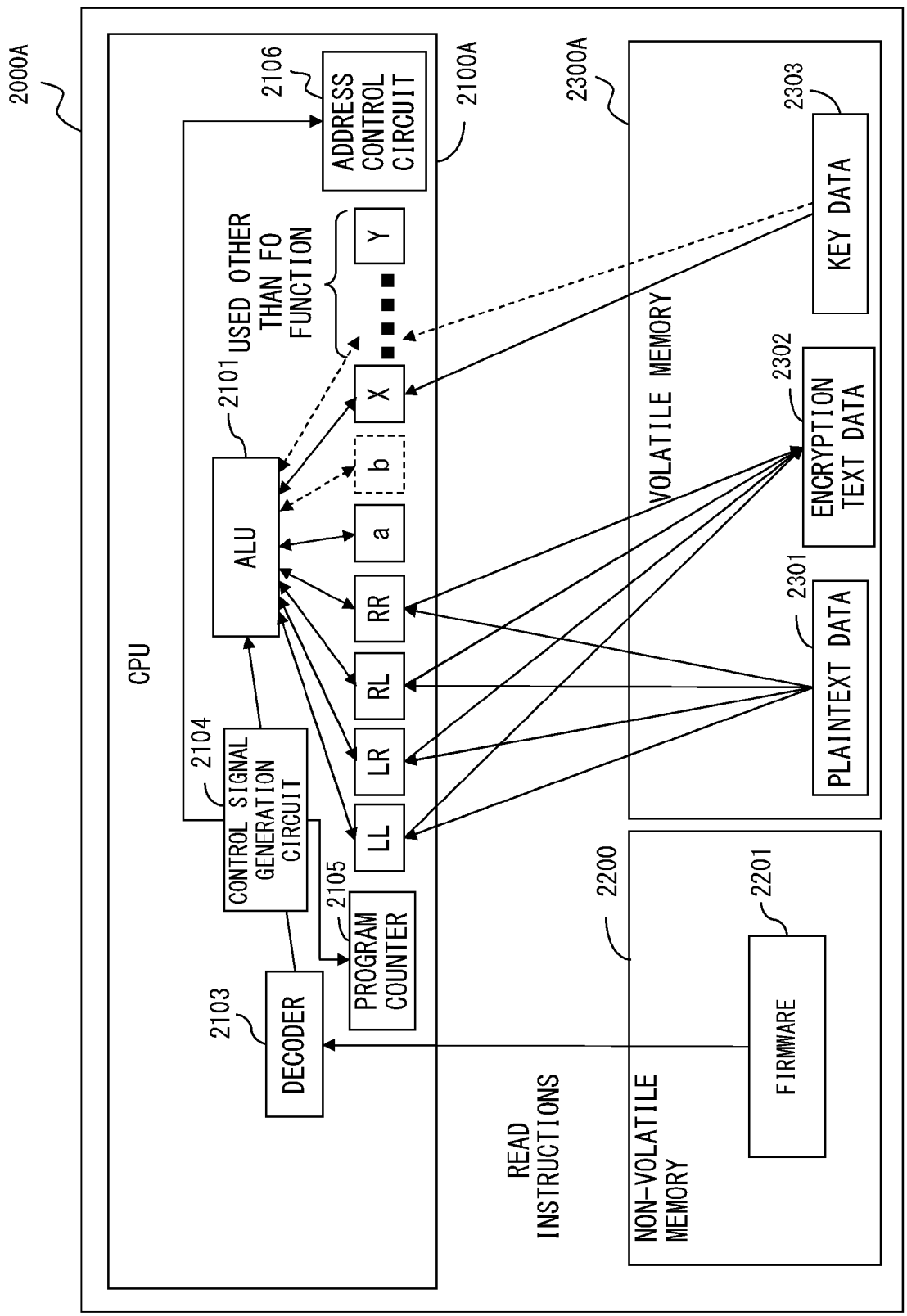
FIG. 13 is the first configuration of an embedded device in the preferred embodiment of the present invention.

FIG. 13 is a first configuration of an embedded device in the preferred embodiment of the present invention. An embedded device 2000A illustrated in FIG. 13 includes a CPU 2100A, non-volatile memory 2200 and volatile memory 2300A. The CPU 2100A is connected to the non-volatile memory 2200 and volatile memory 2300A by a bus, which is not illustrated.

The CPU 2100A includes an ALU (arithmetic logic unit) 2101, an instruction register, which is not illustrated, a decoder (instruction decoder) 2103, a control signal generation circuit 2104, a program counter 2105, a plurality of registers (registers LL, LR, RL, RR, a, b, X, . . . and Y) and an address control circuit 2106. The respective pieces of bit width of the plurality of these registers are 16 bits.

The non-volatile memory 2200 is, for example, flash memory or ROM (read-only memory) and stores a program (firmware) describing instructions for the CPU 2100A to execute the process algorithms of the above-described first through third preferred embodiments.

The CPU 2100A sequentially reads instructions in the firmware 2201 from the non-volatile memory 2200 from top and stores the instructions in the instruction register. The decoder 2103 decodes the instructions stored in the instruction register and outputs their contents to the control signal generation circuit 2104. The control signal generation circuit 2104 outputs an instruction signal corresponding to a calculation specified by the instruction to the ALU 2101 on the basis of the instruction contents. The ALU 2101 performs an arithmetic calculation or a logical calculation according to an instruction signal inputted from the control signal generation circuit 2104. Data used in these calculations is stored in registers. The ALU 2101 reads data to be used for a calculation from the register storing the data and performs the calculation using it. Then, it writes the calculation result in a corresponding register. The program counter 2105 stores the storage address of the instruction of the firmware 2201 being currently executed by the CPU 2100A. The program counter 2105 stores the address of the instruction of the firmware 2201 being currently executed by the CPU 2100A and counts it up every time the execution of the instruction is completed.

The address control circuit 2106 outputs the storage address of an instruction executed by the CPU 2100A and of data to be read/written to the non-volatile memory 2200 or the volatile memory 2300A. It outputs the storage address of data to be read from the volatile memory 2300A to the volatile memory 2300A. By this address output, the instruction of the firmware 2201 is read from the non-volatile memory 2200 and is stored in the instruction register. Plaintext data and key data is read from the volatile memory 2300 and is stored in the register in the CPU 2100A.

The volatile memory 2300A is semiconductor memory, such as RAM (random-access memory) or the like and has a storage area for storing plaintext data 2301, ciphertext data 2302 and key data 2303.

The plaintext data 2301 is data to be encoded. The plaintext data 2301 is divided into 64-bit blocks from top and is encoded for each block. The 64-bit block data is divided into the higher-order 32-bit data L and the lower-order 32-bit data R. Then, the higher-order 32-bit data L is further divided into the higher-order 16-bit data LL and the lower-order 16-bit data LR. The lower-order 32-bit data R is further divided into the higher-order 16-bit data RL and the lower-order 16-bit data RR. In the FI function process, the exclusive OR calculation of the higher-order 16-bit data LL and the lower-order 16-bit data LR and a key KOik (k=1 and 2) and the data conversion of the calculation result using a key KIik (k=1, 2) are performed. The respective pieces of block data (64-bit data) of the plaintext data 2301 are encoded into 64-bit encrypted data by the CPU 2100A executing the program (firmware) in this preferred embodiment. This piece of encrypted data is stored in the volatile memory 2300A as the ciphertext data 2302 immediately after the execution of the above program is completed.

The plaintext data 2301 is encoded using a 128-bit key K. Keys (Round keys) KOi1 through KOi4, KIi1 through KIi3, KLi1 and KLi2 used to encode the plaintext data 2301 by this preferred embodiment are generated by the above private key K. More specifically, firstly, the private key K is divided into eight 16-bit partial keys K1, K2, . . . and K8 from the MSB side. Then, extended keys KOi1 through KOi4, KIi1 through KIi3, KLi1 and KLi2 are generated by performing a key scheduling process (key extension process) using these eight 16-bit partial keys K1 through K8. Extended keys KOij (j=1-4) and KIik (k=1-3) are 64 bits and 48 bits, respectively, per FO function. An extended key KLim (m=1 and 2) is 32 bits per FL function. The extended keys KOij and KIik are used in an FO function and the extended key KIik is used in an FI function. The extended key KLim is used in an FL function. In the case of MISTY 1, the extended keys KOi1 through KOi4 are four, of the keys K1, K2, K3, K4, K5, K6, K7 and K8 obtained by dividing the 128-bit private key K in units of 16 bits.

Key data 2303 is used data about keys used to encode the plaintext data 2301 and includes data including the private keys K (K1-K8) and the extended keys K'1 through K'8. Corresponding relations between the private keys K1 through K8 and the extended keys K'1 through K'8 and the extended keys KOi1 through KOi4, KIi1 through KIi3 and KLi1 and KLi2 are as described in the earlier described "Encryption Descriptive Specification MISTY 1".

Although the CPU 2100A converts the plaintext 2301 to the ciphertext data 2302 using the key data 2303, the intermediate result in the course of this data conversion process is stored in only the register "a" or the registers "a" and "b". The encrypted data (64 bits) obtained by converting the plaintext data 2301 is stored in the registers LL, LR, RL and RR by the ALU 2101. The data input/output (the input of the plaintext data 2301, the output of the ciphertext data 2302, the input of the key data 2303 and the like) between the register in the CPU 2100A and the non-volatile memory 2200 is made via a network, a bus or the like.

In the embedded device having the first configuration, after the plaintext data 2301 and the key data 2303 are stored in the register in the CPU 2100A, the plaintext data 2301 is encoded for each block by an FO function process and an exclusive OR. The plaintext data 2301 is read from the volatile memory 2300A for each block by the CPU 2100A and is stored in the registers LL, LR, RL and RR. Data LL, LR, RL and RR is stored in the registers LL, LR, RL and RR, respectively. The key data 2303 is read from the volatile memory 2300A by the CPU 2100A and is registered in a register, such as the register X or the like.

{Second Configuration of Embedded Device}

Figure 14:
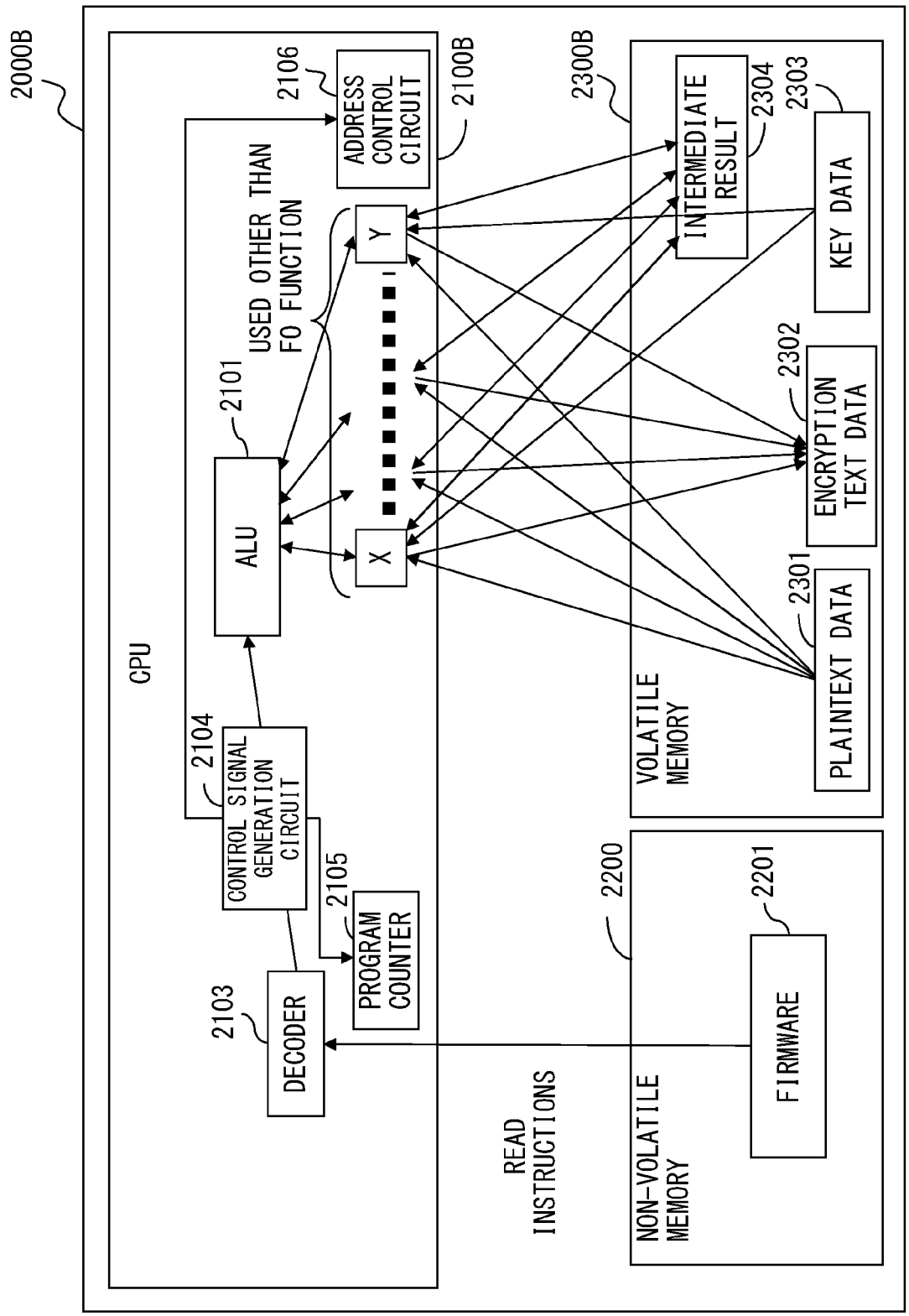
FIG. 14 is the second configuration of an embedded device in the preferred embodiment of the present invention.

FIG. 14 is a second configuration of the embedded device in the preferred embodiment of the present invention. In FIG. 14, the same reference numerals are attached to the same components as those of the embedded device illustrated in FIG. 13.

Firstly, an embedded device 2000B illustrated in FIG. 14 differs from the embedded device 2000A illustrated in FIG. 13 in the register configuration of a CPU. Although the CPU 2100B of the embedded device 2000B includes the registers X, . . . and Y, it includes no registers LL, LR, RL, RR, "a" and "b". Volatile memory 2300B includes an area for storing an intermediate result 2304. The intermediate result 2304 is data (intermediate result) to be temporarily stored in the course of a process of converting the plaintext data 2301 to the ciphertext data 2302 by the CPU 2100B and corresponds to the data LL, LR, RL, RR and the like in this preferred embodiment.

In the embedded device 2000B, the plaintext data 2301 in the volatile memory 2300B is stored in the registers X, . . . and Y of the CPU 2100B. The key data 2303 is stored in the registers X, . . . and Y from the in the volatile memory 2300B. The CPU 2100B converts the plaintext data 2301 to ciphertext data by the ALU 2101, using the plaintext data 2301 and the key data 2303 stored in the registers X, . . . and Y. After this piece of ciphertext data is stored in the registers X, . . . and Y, it is written into the volatile memory 2300B as the ciphertext data 2302. In the course of the process of converting the plaintext data 2301 to the ciphertext data 2302, the intermediate result 2304 is transmitted/received between the volatile memory 2300B and the ALU 2101 via the registers X, . . . and Y.

{Third Configuration of Embedded Device}

FIG. 15 is a third configuration of the embedded device in the preferred embodiment of the present invention. In FIG. 15, the same reference numerals are attached to the same components as those of the embedded device 2000A illustrated in FIG. 13.

An embedded device 2000C illustrated in FIG. 15 differs from the embedded device 2000A illustrated in FIG. 13 in the configuration of volatile memory. The volatile memory 2300C of the embedded device 2000C includes an area for storing an extended key 2305 in addition to the area for storing the plaintext data 2301, the ciphertext data 2303 and the key data 2303. The extended key 2305 includes extended keys K1' through K8' and the like. When a CPU 2100C performs a process, of these extended keys, an extended key used in other than an FO function is read from the volatile memory 2300C and inputted to the ALU 2101. Since as described above, the extended keys K1' through K8' are generated from the private key K (K1-K8) using an FI function, when it is configured in such away that the embedded device 2000C may generate the extended keys K1' through K8' from the private key K, the extended keys K1' through K8' generated by the CPU 2100 are written into the volatile memory 2300C as an extended key 2305 after being stored in the registers X, . . . and Y from the ALU 2101.

Software Implementation Embodiment

Next, the preferred embodiment of a program for realizing the function of the FO function-related processing circuits in the above first through third preferred embodiments by a software process in the embedded device 2000A having the first configuration will be explained.

Software Implementation Embodiment of the FO Function-Related Processing Circuit in First Embodiment FIG. 16 is a flowchart illustrating the algorithm of firmware 2201 implemented in the embedded device having the first configuration in order to realize the function of the FO function-related processing circuit in the above first preferred embodiment. An algorithm illustrated in the flowchart of FIG. 16 is obtained by modifying the above cycle execution order of the process algorithm AL1. Specifically, the algorithm illustrated in the flowchart of FIG. 16 is designed in such a way as to the respective cycles of the above process algorithm AL1 in the order of cycles 1, 3 and 2.

The algorithm illustrated in the flowchart of FIG. 16 will be explained.

In step S11, the following process corresponding to the cycle 1 of the above process algorithm in the first preferred embodiment is performed and the execution result (=t1) of this process is stored in the register A.

$FI((LL \oplus KOi1), KIi1) \oplus LR$ [Expression 25]

Then, in step S12, a process corresponding to the cycle 3 of the above process algorithm AR1 is performed. In step S12, firstly, the following process is performed and the execution result is stored in a "register storing RR".

$FI(((\text{Contents of register } A) \oplus KOi3), KIi3) \oplus (\text{Contents of register storing } RR)$ [Expression 26]

Then, the following process is performed and the execution result is a "register storing RL".

$KOi4 \oplus (\text{Contents of register storing } RL)$ [Expression 27]

Then, in step S13, a process corresponding to the cycle 2 of the above process algorithm AR1 is performed. In step S13, the following process is performed and the execution result (t=3) is stored in the register A.

$FI((LR \oplus KOi2), KIi2) \oplus (\text{Contents of register } A)$ [Expression 28]

Then, lastly, a process in step S14 is performed.

In step S14, firstly, the following process is performed and the execution result is stored in a "register storing RR".

$$(\text{Contents of register } A) \oplus (\text{Contents of register storing } RR) \quad \text{[Expression 29]}$$

Then, the following process is performed and the execution result is stored in a "register storing RL".

$$(\text{Contents of register } A) \oplus (\text{Contents of register storing } RL) \quad \text{[Expression 30]}$$

FIG. 17 is a preferred embodiment of the program operating in the algorithm illustrated in FIG. 16.

A program 3000A illustrated in FIG. 17 is a source program described by assembler language. Prior to the execution of this program 3000A, the data L and R, the private key K and the extended keys K1' through K8' are stored in the register in the CPU 2100. More specifically, the higher-order 16 bits LL of the data L is stored in the register LL and the lower-order 16 bits LR of the data L is stored in the register LR. The higher-order 16 bits RL of the data R is stored in the register RL and the lower-order 16 bits RR of the data R is stored in the register RR. As to the extended keys KOi1, KOi2, KOi3 and KOi4, appropriate ones are selected from the key stored in the volatile memory according to an FO function to be processed and are stored in the register X. This also applies to programs 3000B and 3000C described later.

In the program 3000A, the register "a" corresponds to the register A in the flowchart illustrated in FIG. 16. In the program 3000A, an MOV instruction and an XOR instruction use data stored in the register. Therefore, the CPU 2100A can execute the program 3000A in high speed.

Figure 18:
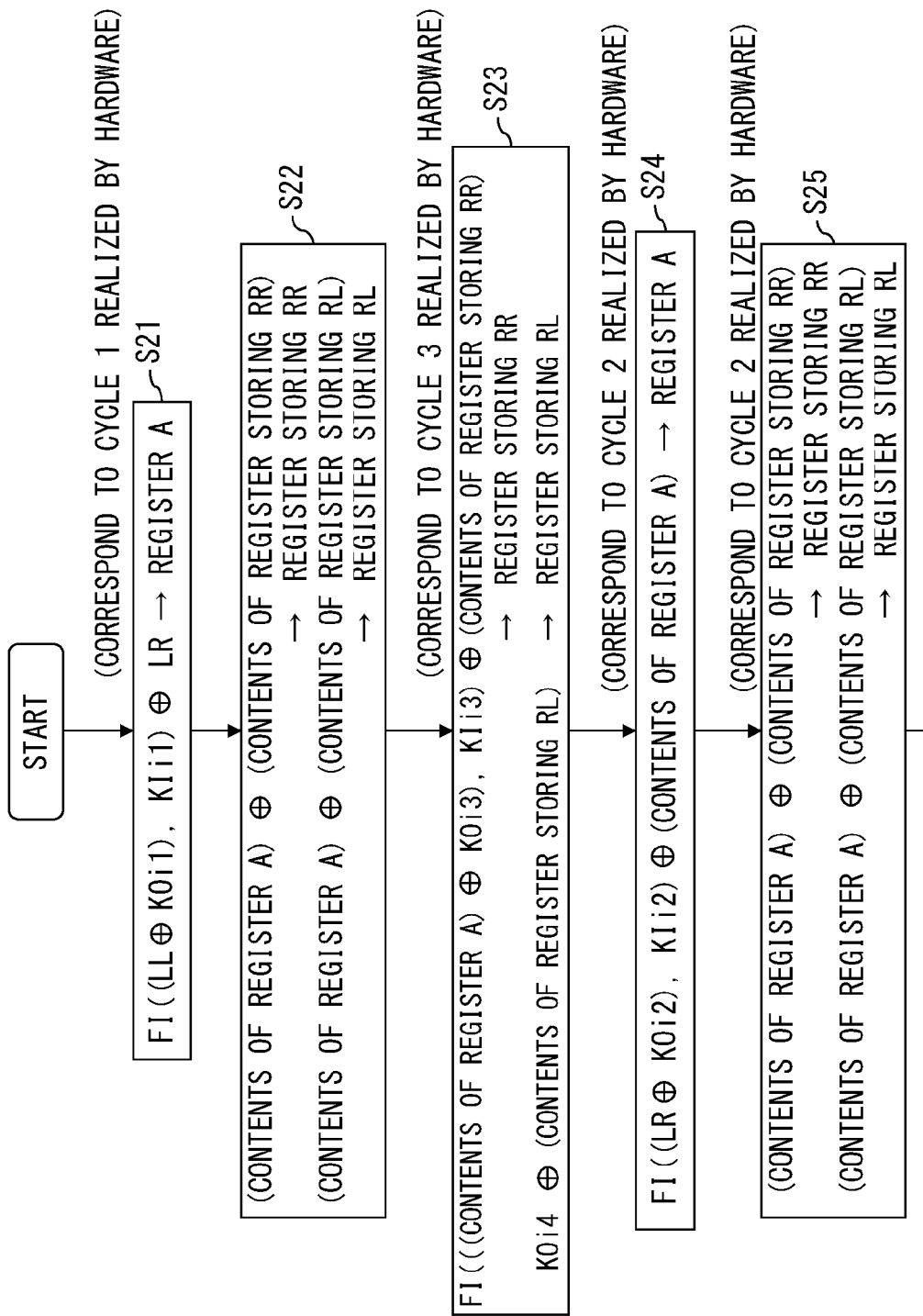
FIG. 18 is a flowchart illustrating the algorithm of software (a program) installed in the embedded device having the first configuration in order to realize the function of the FO function-related processing circuit in the second preferred embodiment of the present invention.

Software Implementation Embodiment of the FO Function-Related Processing Circuit in Second Embodiment FIG. 18 is a flowchart illustrating the algorithm of firmware 2201 implemented in the above embedded device 2000A having the first configuration in order to realize the function of the FO function-related processing circuit in the second preferred embodiment of the present invention. An algorithm illustrated in the flowchart of FIG. 18 is obtained by modifying the cycle execution order of the above process algorithm AL2 in such a way that the CPU 2100 may execute a program using the small number as much as possible, of used registers. Specifically, the algorithm illustrated in the flowchart of FIG. 18 is designed in such a way that the CPU 2100 may execute the respective cycles of the above process algorithm AL2 in the order of the cycles 1, 3 and 2. Thus, by executing cycle 3 following cycle 1, the CPU 2100 can freely use the register A after the completion of the process of cycle 3.

The algorithm of the flowchart illustrated in FIG. 18 will be explained.

Steps S21 and S22, a process corresponding to cycle 1 of the above process algorithm in the second preferred embodiment is performed. In step S21, the following process is performed and the execution result (t=1) of this process is stored in the register A.

$$FI((LL \oplus KOi1), KIi1) \oplus LR \quad \text{[Expression 31]}$$

In step S22, firstly, the following process is performed and the execution result is stored in a "register storing RR".

$$(\text{Contents of register } A) \oplus (\text{Contents of register storing } RR) \quad \text{[Expression 32]}$$

Then, the following process is performed and the execution result is stored in a "register storing RL".

$$(\text{Contents of register } A) \oplus (\text{Contents of register storing } RL) \quad \text{[Expression 33]}$$

Then, in step S23, a process corresponding to cycle 3 of the above process algorithm AL2 is performed. In step S23, firstly, the following process is performed and the execution result is stored in a "register storing RR".

$$FI(((\text{Contents of register } A) \oplus KOi3), KIi3) \oplus (\text{Contents of register storing } RR) \quad \text{[Expression 34]}$$

Then, the following process is performed and the execution result is stored in a "register storing RL".

$$KOi4 \oplus (\text{Contents of register storing } RL) \quad \text{[Expression 35]}$$

Then, lastly, in steps S24 and S25, a process corresponding to cycle 2 of the above process algorithm AL2 is performed. In step S24, the following process is performed and the execution result (t=3) is stored in the register A.

In step S24, the following process is performed and the execution result (t=3) is stored in the register A.

$$FI((LR \oplus KOi2), KIi2) \quad \text{[Expression 36]}$$

Then, in step S25, firstly, the following process is performed and the execution result is stored in a "register storing RR".

$$(\text{Contents of register } A) \oplus (\text{Contents of register storing } RR) \quad \text{[Expression 37]}$$

Then, the following process is performed and the execution result (t=3) is stored in a "register storing RL".

$$(\text{Contents of register } A) \oplus (\text{Contents of register storing } RL) \quad \text{[Expression 38]}$$

FIG. 19 is a preferred embodiment of the program operating in the algorithm illustrated in FIG. 18.

The MOV instruction and XOR instruction and CALL instruction of the program 3000B illustrated in FIG. 18 is the same instructions as the same descriptive instructions of the program 3000A illustrated in FIG. 17. Since the instructions of the program 3000B use data stored in the register, the program 3000B can be processed in high speed.

Software Implementation Embodiment of the FO Function-Related Processing Circuit in Third Embodiment FIG. 20 is a flowchart illustrating the algorithm of firmware 2201 implemented in the embedded device having the first configuration in order to realize the function of the FO function-related processing circuit in the third preferred embodiment of the present invention. An algorithm illustrated in the flowchart of FIG. 20 is obtained by modifying the cycle execution order of the above process algorithm AL3 in such a way that the CPU 2100A may execute a program using the small number as much as possible, of used registers. Specifically, the algorithm illustrated in the flowchart of FIG. 20 is designed in such a way that the CPU 2100A may execute the respective cycles of the above process algorithm AL3 in the order of the cycles 1, 3 and 2. Thus, by executing cycle 3 following cycle 1, the CPU 2100A can freely use the register A after the completion of the process of cycle 3.

The algorithm of the flowchart illustrated in FIG. 20 will be explained.

In steps 31 and S32, a process corresponding to cycle 1 of the above process algorithm AL3 in the third preferred embodiment is performed. In step S31, the following process is performed and the execution result (t=1) is stored in the register A.

$$FI((LL \oplus KOi1), KIi1) \oplus LR \quad \text{[Expression 39]}$$

In step S32, firstly, the following process is performed and the execution result is stored in a "register storing RR".

(Contents of register A)⊕(Contents of register storing RR)     [Expression 40]

Then, the following process is performed and the execution result is stored in a "register storing RL".

(Contents of register A)⊕(Contents of register storing RL)     [Expression 41]

Then, in step S33, a process corresponding to cycle 3 of the above process algorithm AL3 is performed. Firstly, in step S33, the following process is performed and the execution result is stored in a "register storing RR".

FI(((Contents of register A)⊕KOi3),KIi3)⊕(Contents of register storing RR)⊕KOi4     [Expression 42]

Then, in steps S34 and S35, a process corresponding to cycle 2 of the above process algorithm AL3 is performed. In step S34, the following process is performed and the execution result is stored in the register A.

FI((LR⊕KOi2),KIi2)⊕KOi4     [Expression 43]

Then, lastly, in step S35, firstly, the following process is performed and the execution result is stored in a "register storing RR".

(Contents of register A)⊕(Contents of register storing RR)     [Expression 44]

Then, the following process is performed and the execution result is stored in a "register storing RL".

(Contents of register A)⊕(Contents of register storing RL)     [Expression 45]

FIG. 21 is a preferred embodiment of the program operating in the algorithm illustrated in FIG. 20.

The MOV instruction, XOR instruction and CALL instruction of the program 3000C illustrated in FIG. 21 is the same instructions as the same descriptive instructions of the program 3000A illustrated in FIG. 17. Since the instructions of the program 3000C use data stored in the register, the program 3000C can be processed in high speed.

The present invention is not limited the above-described preferred embodiments and can be changed, substituted and altered without departing from the spirit and scope of the invention. For example, although in the above preferred embodiments, the present invention is applied to MISTY 1, the present invention is not limited to MISTY 1. The present invention is applicable to all encryption algorithms having a Feistel structure, such as MISTY 2, KASUMI and the like.

The present invention is very useful as an embedded system of a small-size electronic device requiring a security function.

What is claimed is:

1. An encryption device including a data processing unit to convert 2n-bit data L and an exclusive OR calculator to calculate an exclusive OR of a process result of the data processing unit and 2n-bit data R comprising:

a first register to store n-bit data;
a first multiplexer to selectively output one of the n-bit data stored in the first register, the higher-order n bits LL of the data L and lower-order n bits LR of the data L;
a first exclusive OR calculator to calculate an exclusive OR of an output of the first multiplexer and a round key KOij (j=natural number);
a first data processing unit to convert an output of the first exclusive OR calculator to n-bit data, using an extended key KIik (k=natural number);
a second multiplexer to selectively output one of lower-order n bits LR of the data L, n-bit "0" data and n-bit data stored in the first register;
a second exclusive OR calculator to calculate an exclusive OR of an output of the second multiplexer and an output of the first data processing unit;
a de-multiplexer to output an output of the second exclusive OR calculator to the first register;
a third multiplexer to selectively output one of an output of the second exclusive OR calculator or a round key KOim (m=natural number);
a second register to store the data R;
a third exclusive OR calculator to calculate an exclusive OR of higher-order n bits RL of data R stored in the second register and an output of the third multiplexer; and
a fourth exclusive OR calculator to calculate an exclusive OR of an output of the second multiplexer and lower-order n bits RR of data R stored in the second register, wherein
the first multiplexer, the second multiplexer, the third multiplexer and the de-multiplexer are externally controlled,
the first register inputs and stores an output of the de-multiplexer, and
the second register stores an output of the third OR calculator and an output of the fourth exclusive OR calculator as higher-order n bits RL and lower-order n bits RR of data R, respectively.

2. An encryption device including a data processing unit to convert 2n-bit data L and an exclusive OR calculator to calculate an exclusive OR of a process result of the data processing unit and 2n-bit data R comprising:

a first register to store n-bit data;
a first multiplexer to selectively output one of n-bit data stored in the first register, higher-order n bits LL of the data L and lower-order n bits LR of the data L;
a first exclusive OR calculator to calculate an exclusive OR of an output of the first multiplexer and a round key KOij (j=natural number);
a first data processing unit to convert an output of the first exclusive OR calculator to n-bit data, using an extended key KIik (k=natural number);
a second multiplexer to selectively output one of lower-order n bits LR of the data L and n-bit "0" data;
a second exclusive OR calculator to calculate an exclusive OR of an output of the second multiplexer and an output of the first data processing unit;
a third multiplexer to selectively output one of an output of the second exclusive OR calculator and a round key KOim;
a second register to store the data R;
a third exclusive OR calculator to calculate an exclusive OR of higher-order n bits RL of data R stored in the second register and an output of the third multiplexer; and
a fourth exclusive OR calculator to calculate an exclusive OR of an output of the second exclusive OR calculator and lower-order n bits RR of the data R stored in the second register, wherein
the first multiplexer, second multiplexer and third multiplexer are externally controlled,
the first register inputs and stores an output of the second exclusive OR calculator and
the second register stores an output of the third exclusive OR calculator and an output of the fourth exclusive OR calculator as higher-order n bits RL and lower-order n bits RR of the data R, respectively.

3. An encryption device including a data processing unit to convert 2n-bit data L and an exclusive OR calculator to calculate an exclusive OR of the process result of the data processing unit and 2n-bit data R comprising:
- a first register to store n-bit data;
- a first multiplexer to selectively output one of n-bit data stored in the first register, higher-order n bits LL of the data L and lower-order n bits LR of the data L;
- a first exclusive OR calculator to calculate an exclusive OR of an output of the first multiplexer and a round key KOij (j=natural number);
- a first data processing unit to convert an output of the first exclusive OR calculator to n-bit data, using an extended key KIik (k=natural number);
- a second multiplexer to selectively output one of lower-order n bits LR of the data L and a n-bit round key KOim (m=natural number);
- a second exclusive OR calculator to calculate an exclusive OR of an output of the second multiplexer and an output of the first data processing unit;
- an output unit to input an output of the second exclusive OR calculator and output the input with appropriate timing;
- a second register to store the data R;
- a third exclusive OR calculator to calculate an exclusive OR of higher-order n bits RL of the data R stored in the second register and an output of the switch unit; and
- a fourth exclusive OR calculator to calculate an exclusive OR of an output of the second exclusive OR calculator and lower-order n bits RR of the data R stored in the second register, wherein
- the first multiplexer, second multiplexer and the output unit are externally controlled,
- the first register inputs and stores an output of the second exclusive OR calculator and
- the second register stores an output of the third OR calculator and an output of the fourth exclusive OR calculator as higher-order n bits RL and lower-order n bits RR of the data R, respectively.

4. The encryption device according to claim 3, wherein the output unit is a third multiplexer for selectively outputting n-bit "0" data or an output of the second exclusive OR calculator.

5. The encryption device according to any one of claim 1, further comprising
a third register to input, store and output the data L.

6. An encryption method for converting 2n-bit data L, calculating an exclusive OR of the data conversion result and 2n-bit data R and outputting the exclusive OR calculation result, comprising:
- a step of a cycle 1 of calculating an exclusive OR of higher-order n bits LL of the data L and a round key KOi1, converting a logical calculation result of the exclusive OR, using an extended key KIi1, calculating an exclusive OR of the data conversion result and lower-order n bits LR of the data L and outputting logical calculation result t1 of the exclusive OR;
- a step of a cycle 2 of calculating an exclusive OR of lower-order n bits LR of the data L and a round key KOi2, converting a logical calculation result of the exclusive OR, using an extended key KIi2, calculating an exclusive OR of the data conversion result and a logical calculation result t1 outputted in the step of the cycle 1, calculating an exclusive OR of a logical calculation result t3 of the exclusive OR and lower-order n bits RR of the data R and outputting a logical calculation result of the exclusive OR as new lower-order n bits RR, and calculating an exclusive OR of the logical calculation result t3 and higher-order n bits RL of the data R and outputting the logical calculation result as new higher-order n bits RL; and
- a step of a cycle 3 of calculating an exclusive OR of the exclusive OR calculation result t1 and a round key KOi3, converting a logical calculation result of the exclusive OR, using an extended key KIi3, calculating an exclusive OR of the data conversion result and lower-order n bits RR generated in the cycle 2 and outputting a logical calculation result of the exclusive OR as new lower-order n bits RR, and calculating an exclusive OR of higher-order n bits RL outputted in cycle 2 and a round key KOi4 and outputting a logical calculation result of the exclusive OR as new higher-order n bits RL.

7. An encryption method for converting 2n-bit data L, calculating an exclusive OR of the data conversion result and 2n-bit data R and outputting the exclusive OR calculation result, comprising:
- a step of a cycle 1 of calculating an exclusive OR of higher-order n bits LL of the data L and a round key KOi1, converting a logical calculation result of the exclusive OR, using an extended key KIi1, calculating an exclusive OR of the data conversion result and lower-order n bits LR of the data L, calculating an exclusive OR of a logical calculation result t1 of the exclusive OR and lower-order n bits RR of the data R and outputting the logical calculation result of the exclusive OR as new lower-order n bits RR of the data R, and calculating an exclusive OR of a logical calculation result t1 and higher-order n bits RL and outputting the logical calculation result of the exclusive OR as new higher-order n-bits RL;
- a step of a cycle 2 of calculating an exclusive OR of the lower-order n bits LR of data L and a round key KOi2, converting a logical calculation result of the exclusive OR, using a key KIi2, calculating an exclusive OR of the data conversion result t3 and RL outputted in the cycle 1 and outputting the exclusive OR of the data conversion result t3 and RL as RL, and further calculating an exclusive OR of t3 and RR outputted in the cycle 1 and outputting the exclusive OR of t3 and RR as RR; and
- a step of a cycle 3 of calculating an exclusive OR of the logical calculation result t1 and a round key KOi3, converting a logical calculation result of the exclusive OR, using a key KIi3, calculating an exclusive OR of the data conversion result and lower-order n bits RR generated in the cycle 2 and outputting the logical calculation result of the exclusive OR as new lower-order n bits RR, calculating the exclusive OR of higher-order n bits RL outputted in cycle 2 and a round key KOi4 and outputting the logical calculation result of the exclusive OR as new higher-order n bits RL.

8. An encryption method for converting 2n-bit data L, calculating an exclusive OR of the data conversion result and 2n-bit data R and outputting the exclusive OR calculation result, comprising:
- a step of a cycle 1 of calculating an exclusive OR of higher-order n bits LL of the data L and a round key KOi1, converting the exclusive OR calculation result, using a key KIi1, calculating an exclusive OR of the data conversion result and lower-order n bits LR of the data L, calculating an exclusive OR of the exclusive OR calculation result t1 and lower-order n bits RR of the data R and outputting the logical calculation result of the exclusive OR as new lower-order n bits RR, and calculation an exclusive OR of a logical calculation result t1 and higher-order n bits RL of the data R and outputting the logical calculation result of the exclusive OR as new higher-order n bits RL;

a step of a cycle 2 of calculating the exclusive OR of the lower-order n bits LR of the data L and a round key KOi2, converting the data of the logical calculation result of the exclusive OR, using a key KIi2, calculating the exclusive conversion result and a round key KOi4, calculating an exclusive OR of a logical calculation result t3 of the exclusive OR and lower-order n bits RR of the data R and outputting the logical calculation result of the exclusive OR as new lower-order n bits RR, and calculating an exclusive OR of the logical calculation result t3 and higher-order n bits RL of the data R and outputting the logical calculation result of the exclusive OR as new higher-order n bits RL of the data R; and a step of a cycle 3 of calculating an exclusive OR of the exclusive OR calculation result t1 and a round key KOi3, converting the logical calculation result of the exclusive OR, using an extended key KIi3, calculating an exclusive OR of the data conversion result and lower-order n bits RR generated in the cycle 2, calculating an exclusive OR of the logical calculation result of the exclusive OR and a round key KOi4 and outputting the logical calculation result of the exclusive OR as new lower-order n bits RR, and outputting higher-order n bits RL outputted in the cycle 2.

9. A non-transitory computer-readable portable storage medium, on which is stored a program for enabling a computer to execute an encryption process for converting 2n-bit data L, calculating an exclusive OR of the data conversion result and 2n-bit data R and outputting a logical calculation result of the exclusive OR, comprising:

a process of a cycle 1 of calculating an exclusive OR of higher-order n bits LL of the data L and a round key KOi1, converting a logical calculation result of the exclusive OR, using an extended key KIi1, calculating an exclusive OR of the data conversion result and lower-order n bits LR of the data L and outputting logical calculation result t1 of the exclusive OR;

a process of a cycle 2 of calculating an exclusive OR of the logical calculation result t1 and a round key KOi3, converting a logical calculation result of the exclusive OR, using a key KIi3, calculating an exclusive OR of the data conversion result and lower-order n bits RR of the data R and defining the logical calculation result of the exclusive OR as new lower-order n bits RR, and calculating an exclusive OR of higher-order n bits RL of the data R and a round key KOi4 and outputting the logical calculation result of the exclusive OR as new higher-order n bits RL; and a process of a cycle 3 of calculating an exclusive OR of the lower-order n bits LR of the data L and a round key KOi2, converting a logical calculation result of the exclusive OR, using an extended key KIi2, calculating an exclusive OR of the data conversion result and a logical calculation result t1 outputted in the step of the cycle 1 and calculating an exclusive OR of the logical calculation result of the exclusive OR t3 and lower-order n bits RR outputted in cycle 2 and outputting the logical calculation result as new lower-order n bits RR, and, calculating an exclusive OR of the logical calculation result t3 and higher-order n bits RL outputted in cycle 2 and outputting the logical calculation result as new higher-order n bits RL.

10. A non-transitory computer-readable portable storage medium, on which is stored a program for enabling a computer to execute an encryption process for converting 2n-bit data L, calculating an exclusive OR of the data conversion result and 2n-bit data R and outputting a logical calculation result of the exclusive OR, comprising:

a process of a cycle 1 of calculating an exclusive OR of higher-order n bits LL of the data L and a round key KOi1, converting a logical calculation result of the exclusive OR, using a key KIi1, calculating an exclusive OR of the data conversion result and lower-order n bits LR of the data L, calculating an exclusive OR of a logical calculation result t1 of the exclusive OR and lower-order n bits RR of the data R and outputting the logical calculation result, and calculating an exclusive OR of a logical calculation result t1 and lower-order n bits RR of the data and outputting the logical calculation result of the exclusive OR as new lower-order n bits RR and calculating an exclusive OR of the logical calculation result t1 and higher-order n bits RL of the data and outputting the logical calculation result of the exclusive OR as new higher-order n bits RL;

a process of a cycle 2 of calculating an exclusive OR of the logical calculation result t1 and a round key KOi3, converting a logical calculation result of the exclusive OR, using a key KIi3, calculating an exclusive OR of the data conversion result and lower-order n bits RR generated in the cycle 1 and defining the logical calculation result as new lower-order n bits RR and calculating an exclusive OR of higher-order n bits RL outputted in the cycle 1 and a round key KOi4, and outputting the logical calculation result of the exclusive OR as higher-order n bits RL; and a process of a cycle 3 of calculating an exclusive OR of lower-order n bits LR of the data L and a round key KOi2, converting a logical calculation result of the exclusive OR, using a key KIi2, calculating an exclusive OR of the data conversion result and the logical calculation result t1 outputted in cycle 1 and calculating an exclusive OR of a logical calculation result t3 of the exclusive OR and lower-order n bits RR of the data R and outputting the logical calculation result of the exclusive OR as new lower-order n bits RR, calculating an exclusive OR of the logical calculation result t3 and higher-order n bits RL of the data R, and outputting the logical calculation result of the exclusive OR as new higher-order n bits RL.

11. A non-transitory computer-readable portable storage medium, on which is stored a program for enabling a computer to execute an encryption process for converting 2n-bit data L, calculating an exclusive OR of the data conversion result and 2n-bit data R and outputting a logical calculation result of the exclusive OR, comprising:

a process of a cycle 1 of calculating an exclusive OR of higher-order n bits LL of the data L and a round key KOi1, converting a logical calculation result of the exclusive OR, using a key KIi1, calculating an exclusive OR of the data conversion result and lower-order n bits LR of the data L, outputting the logical calculation result of the exclusive OR as t1, calculating an exclusive OR of the logical calculation result t1 and lower-order n bits RR of the data R and outputting a logical calculation result of the exclusive OR as new lower n bits RR, and calculating an exclusive OR of the logical calculation result t1 and higher n bit RL of the data R and outputting the logical calculation result of the exclusive OR as new higher-order n bits RL;

a process of a cycle 2 of calculating an exclusive OR of the logical calculation result t1 and a round key KOi3, converting the logical calculation result of the exclusive OR, using a key KIi3, calculating an exclusive OR of the data conversion result and lower-order n bits RR generated in the cycle 1, calculating an exclusive OR of the logical calculation result of the exclusive OR and lower-order n bits RR outputted in the cycle 1 and outputting the logical calculation result of the exclusive OR as new lower-order n bits RR, and outputting higher n bits RL outputted in the cycle 2; and a process of a cycle 3 of calculating an exclusive OR of lower-order n bits LR of the data L and a round key KOi2, converting the logical calculation result of the exclusive OR, using a key KIi2, calculating an exclusive OR of the data conversion result and a round key KOi4, calculating an exclusive OR of the logical calculation result t3 of the exclusive OR and lower-order n bits RR of the data R and outputting the calculation result of the exclusive OR as new lower-order n bits RR, and calculating an exclusive OR of the logical calculation result t3 and higher-order n bits RL of the data R and outputting the calculation result of the exclusive OR as new higher-order n bits RL.

12. The encryption device according to any one of claim 2, further comprising
a third register to input, store and output the data L.

13. The encryption device according to any one of claim 3, further comprising
a third register to input, store and output the data L.

\* \* \* \* \*

UNITED STATES PATENT AND TRADEMARK OFFICE
CERTIFICATE OF CORRECTION

PATENT NO. : 8,335,313 B2
APPLICATION NO. : 12/834252
DATED : December 18, 2012
INVENTOR(S) : Jun Yajima et al.

It is certified that error appears in the above-identified patent and that said Letters Patent is hereby corrected as shown below:

Column 33, Line 43, In Claim 5, delete "to any one of" and insert -- to --, therefor.
Column 38, Line 7, In Claim 12, delete "to any one of" and insert -- to --, therefor.
Column 38, Line 10, In Claim 13, delete "to any one of" and insert -- to --, therefor.

Signed and Sealed this
Twenty-sixth Day of March, 2013

Teresa Stanek Rea
*Acting Director of the United States Patent and Trademark Office*